United States Patent [19]

Kojoh et al.

[11] Patent Number: 5,731,393

[45] Date of Patent: Mar. 24, 1998

[54] ETHYLENE POLYMER, PROCESS FOR PREPARING THE SAME, SOLID TITANIUM CATALYST COMPONENT FOR ETHYLENE POLYMERIZATION AND ETHYLENE POLYMERIZATION CATALYST

[75] Inventors: Shin-ichi Kojoh; Mamoru Kioka, both of Yamaguchi, Japan

[73] Assignee: Mitsui Petrochemical Industries, Ltd., Tokyo, Japan

[21] Appl. No.: 835,563

[22] Filed: Apr. 9, 1997

Related U.S. Application Data

[63] Continuation of Ser. No. 390,581, Feb. 17, 1995, abandoned.

[30] Foreign Application Priority Data

Feb. 18, 1994 [JP] Japan .................... 6-021085

[51] Int. Cl.$^6$ .............. C08F 10/02; C08F 4/654
[52] U.S. Cl. ............... 526/124.8; 502/120; 526/125.6; 526/153; 526/138; 526/352
[58] Field of Search ............... 526/124.8, 125.6, 526/352

[56] References Cited

U.S. PATENT DOCUMENTS

| | | | |
|---|---|---|---|
| 4,769,510 | 9/1988 | Kaminsky et al. | 585/512 |
| 5,013,802 | 5/1991 | Tajima et al. | 526/352 |
| 5,268,230 | 12/1993 | Edwards | 428/409 |
| 5,272,236 | 12/1993 | Lai et al. | 526/348.6 |
| 5,296,565 | 3/1994 | Ueda et al. | 526/348.6 |
| 5,459,217 | 10/1995 | Todo et al. | 526/348.6 |
| 5,464,905 | 11/1995 | Tsutsui et al. | 526/348.6 |

FOREIGN PATENT DOCUMENTS

| | | | |
|---|---|---|---|
| 0016707 | 10/1980 | European Pat. Off. . | |
| 0114526 | 8/1984 | European Pat. Off. . | |
| 0452156 | 10/1991 | European Pat. Off. . | |
| 0452920 | 10/1991 | European Pat. Off. . | |
| 452920 | 10/1991 | European Pat. Off. . | |
| 0506074 | 9/1992 | European Pat. Off. . | |
| 519386 | 12/1992 | European Pat. Off. | 526/352 |
| 0610942 | 8/1994 | European Pat. Off. . | |
| 610942 | 8/1994 | European Pat. Off. . | |
| 3443087 | 5/1986 | Germany . | |
| 55-012735 | 1/1980 | Japan . | |
| 57-158204 | 9/1982 | Japan . | |
| 58-157838 | 9/1983 | Japan . | |
| 59-089341 | 5/1984 | Japan . | |
| 59-89341 | 5/1984 | Japan . | |
| 59-164347 | 9/1984 | Japan . | |
| 60-036546 | 2/1985 | Japan . | |
| 60-106806 | 6/1985 | Japan . | |
| 61-130314 | 6/1986 | Japan . | |
| 04-218507 | 8/1992 | Japan . | |
| 42118507 | 8/1992 | Japan . | |
| WO85/05111 | 11/1985 | WIPO . | |

*Primary Examiner*—Edward J. Smith
*Attorney, Agent, or Firm*—Birch, Stewart, Kolasch & Birch, LLP

[57] ABSTRACT

An ethylene polymer having small values of Mw/Mn and Mz/Mw, a small proportion of long-chain branches and a high swell ratio and a process for preparing the polymer are disclosed. A solid titanium catalyst component obtained by initially contacting a solid titanium composite containing titanium, magnesium, halogen and a compound having at least two ether linkages present through plural atoms with an organometallic compound and then contacting the resulting product with oxygen is further disclosed. An ethylene polymerization catalyst comprising the above catalyst component and an organometallic compound catalyst component is furthermore disclosed. The ethylene polymer is excellent in moldability, and from this polymer, a molded article which is excellent in rigidity and impact resistance and free from poor appearance can be obtained. By the use of the ethylene polymerization catalyst, an ethylene polymer having excellent properties as mentioned above can be obtained.

4 Claims, 1 Drawing Sheet

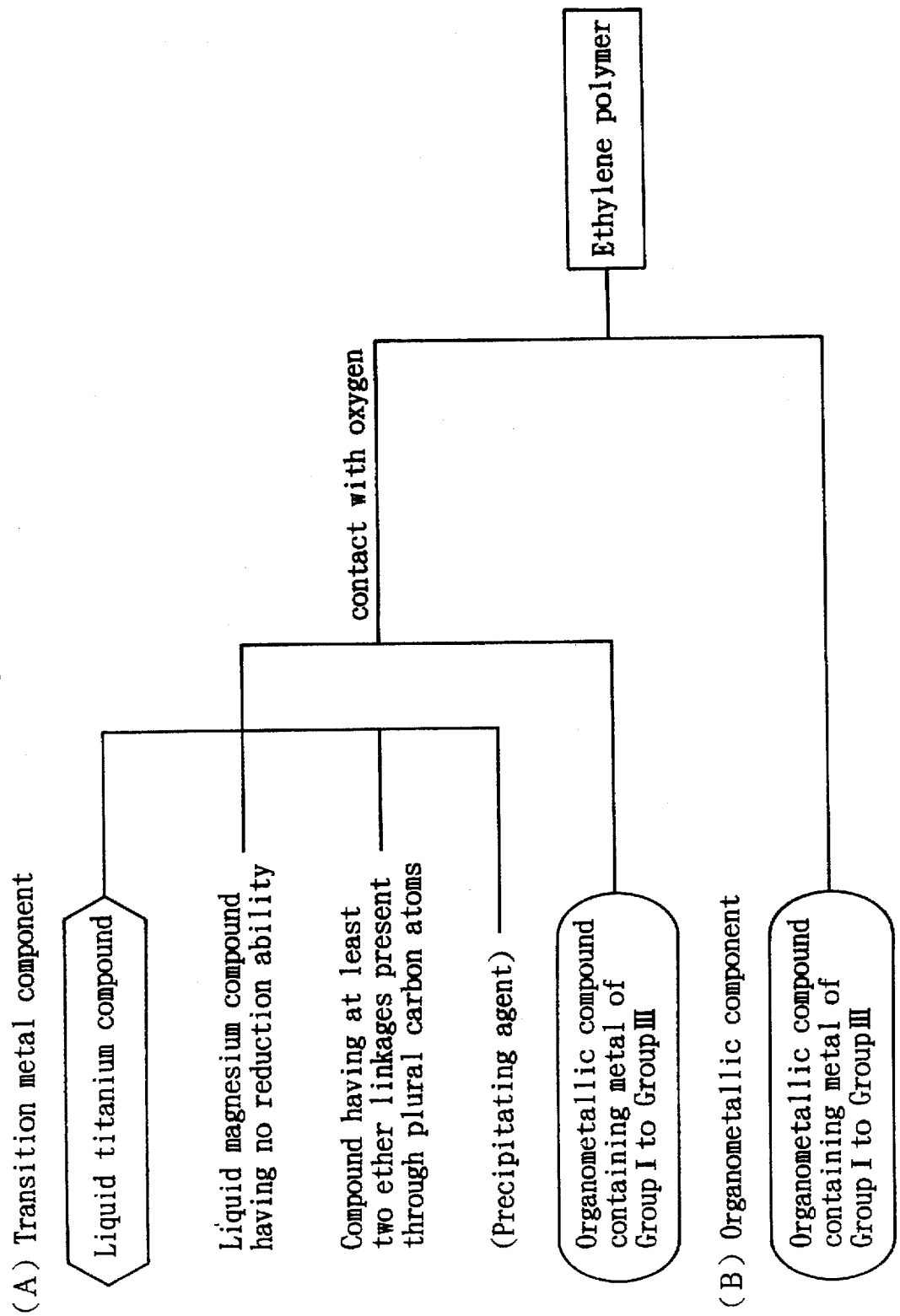

ETHYLENE POLYMER, PROCESS FOR PREPARING THE SAME, SOLID TITANIUM CATALYST COMPONENT FOR ETHYLENE POLYMERIZATION AND ETHYLENE POLYMERIZATION CATALYST

This application is a continuation-in-part of application Ser. No. 08/390,581 filed on Feb. 17, 1995, now abandoned.

FIELD OF THE INVENTION

The present invention relates to an ethylene polymer, a process for preparing the same, a solid titanium catalyst component for ethylene polymerization and an ethylene polymerization catalyst. More particularly, the invention relates to an ethylene polymer having a high swell ratio, a narrow molecular weight distribution and a small proportion of long-chain branches, to a process for preparing the same, and to a solid titanium catalyst component for ethylene polymerization and an ethylene polymerization catalyst which are favorably used for preparing the polymer.

BACKGROUND OF THE INVENTION

Ethylene polymers have heretofore been widely used as materials of hollow molded articles, extrusion molded articles, films and sheets. The properties required for such ethylene polymers vary depending on the use of the polymers and the molding method thereof. For example, an ethylene polymer having a high swell ratio must be used for producing bottles having a good shape of pinch-off scar or hollow molded articles having a narrow thickness distribution by hollow molding.

Ethylene polymers prepared by the use of Ziegler-Natta catalysts such as $MgCl_2$-carrier support type Ti catalysts are excellent in rigidity and impact resistance because almost no long-chain branch is present therein, but they are inferior in moldability to ethylene polymers prepared by the use of Cr type Phillips catalyst. On the other hand, the ethylene polymers prepared by a high-pressure method or prepared by the use of the Cr type Phillips catalysts have a higher swell ratio and higher moldability than the ethylene polymers prepared by the use of the Ziegler-Natta catalysts, but they are deteriorated in the rigidity and impact resistance due to the presence of the long-chain branches.

Under these circumstances, there have been made various studies on the ethylene polymers which are prepared by the use of Ziegler-Natta catalysts and are excellent in moldability and the like.

For example, Japanese Patent Laid-Open Publication No. 12735/1980 describes an ethylene polymer which is obtained by blending an ethylene polymer prepared by the use of Ziegler-Natta catalyst with an ethylene polymer prepared by means of a high-pressure method. Further, Japanese Patent Laid-Open Publication No. 36546/1985 describes an ethylene polymer which is obtained by blending an ethylene polymer prepared by the use of Ziegler-Natta catalyst with an ethylene polymer prepared by the use of Cr type Phillips catalyst. However, although these ethylene polymers are improved in the moldability, the rigidity and impact strength inherent in the ethylene polymer prepared by the use of Ziegler-Natta catalyst are deteriorated because the proportion of the long-chain branches is increased.

Further, Japanese Patent Laid-Open Publication No. 89341/1984 describes an ethylene polymer which is obtained by modifying an ethylene polymer prepared by the use of Ziegler-Natta catalyst, in the presence of a radical initiator; and Japanese Patent Laid-Open Publication No. 164347/1984 describes an ethylene polymer which is obtained by modifying an ethylene polymer prepared by the use of Ziegler-Natta catalyst, with maleic acid. Also in these cases, however, although these ethylene polymers are improved in the moldability, the rigidity and impact strength thereof are deteriorated because the proportion of the long-chain branches is increased.

Furthermore, Japanese Patent Laid-Open Publications No. 158204/1982 and No. 106806/1985 describe ethylene polymers which are obtained by the use of a specific catalyst, have a small proportion of the long-chain branches and are excellent in the moldability. However, these ethylene polymers have large values of Mw/Mn and Mz/Mw and include a polymer having a molecular weight extremely larger than the average molecular weight. Such a polymer causes poor appearance of its molded article such as fish eye in many cases.

Still further, Japanese Patent Laid-Open Publication No. 130314/1986 describes an ethylene polymer excellent in moldability which is prepared by a multi-stage polymerization process. This ethylene polymer has a broad molecular weight distribution thereby to include an ethylene polymer having a molecular weight extremely larger than the average molecular weight, resulting in poor appearance of the molded article such as fish eye.

As described above, there have been made earnest researches on the ethylene polymers which are prepared by the use of Ziegler-Natta catalyst, are excellent in moldability and can be molded into articles excellent in mechanical strength and almost free from poor appearance, but any ethylene polymer having such properties was not found.

The present inventors have studied on the ethylene polymers which are prepared by the use of Ziegler-Natta catalyst, excellent in moldability and can be molded into articles excellent in mechanical strength and almost free from poor appearance. As a result, they have found that an ethylene polymer having a density and a melt flow rate (MFR) in the specific ranges, having a specific relationship between a melt tension (MT) and the melt flow rate and having a molecular weight distribution Mw/Mn, a molecular weight distribution Mz/Mw, a g* value indicating a proportion of long-chain branches and a swell ratio all in the specific ranges is excellent in moldability and can be molded into articles excellent in mechanical strength and almost free from poor appearance. The present inventors have also found that such an ethylene polymer as mentioned above can be prepared by the use of an ethylene polymerization catalyst containing a specific solid titanium catalyst component. Based on these findings, the present invention has been accomplished.

OBJECT OF THE INVENTION

The present invention has been made under such circumstances as mentioned above, and it is an object of the invention to provide an ethylene polymer which is excellent in moldability and is capable of molding an article excellent in rigidity and impact resistance and free from poor appearance such as fish eye. It is another object of the invention to provide a process for preparing the ethylene polymer. It is a further object of the invention to provide a solid titanium catalyst component for ethylene polymerization which is favorably used for preparing the ethylene polymer and to provide an ethylene polymerization catalyst containing the solid titanium catalyst component.

SUMMARY OF THE INVENTION

The ethylene polymer of the invention has the following properties (i) to (vii) that:

(i) the density is in the range of 0.90 to 0.98 g/cm$^3$,
(ii) the melt flow rate, as measured at 190° C. under a load of 2.16 kg, is in the range of 0.001 to 3,000 g/10 min,
(iii) the melt tension (MT) and the melt flow rate (MFR) satisfy the relationship represented by the formula:

$$\log MT < -0.41 \log MFR + 0.75,$$

(iv) the molecular weight distribution Mw/Mn is in the range of 2 to 9,
(v) the molecular weight distribution Mz/Mw is in the range of 2 to 5,
(vi) the g* value, which is an index of a proportion of long-chain branches, is in the range of 0.90 to 1.00, and
(vii) the swell ratio is 1.35 or more.

The ethylene polymer of the invention can be prepared by the use of Ziegler-Natta catalyst, for example, an ethylene polymerization catalyst comprising:

[I] a solid titanium catalyst component obtained by the contact with each other of oxygen and a solid titanium organometallic compound complex which is obtained by the contact with each other of
  (A) a solid titanium composite containing titanium, magnesium, halogen and a compound having at least two ether linkages present through plural atoms, which is obtained by the contact with each other of
    (a) a liquid magnesium compound having no reduction ability,
    (b) a compound having at least two ether linkages present through plural atoms, and
    (c) a liquid titanium compound, and optionally
    (d) a precipitating agent,
  wherein at least one of the components (a), (b), (c) and (d) contains a halogen-containing compound, and
  (B) an organometallic compound containing a metal selected from Group I to Group III of the periodic table; and

[II] an organometallic compound catalyst component containing a metal selected from Group I to Group III of the periodic table.

The ethylene polymer mentioned above is excellent in moldability, and a molded article obtained therefrom is excellent in rigidity and impact resistance and free from occurrence of poor appearance such as fish eye.

The process for preparing an ethylene polymer of the invention comprises homopolymerizing ethylene or copolymerizing ethylene and other olefin than ethylene in the presence of an ethylene polymerization catalyst comprising:

[I] a solid titanium catalyst component obtained by the contact with each other of oxygen and a solid titanium organometallic compound complex which is obtained by the contact with each other of
  (A) a solid titanium composite containing titanium, magnesium, halogen and a compound having at least two ether linkages present through plural atoms, which is obtained by the contact with each other of
    (a) a liquid magnesium compound having no reduction ability,
    (b) a compound having at least two ether linkages present through plural atoms, and
    (c) a liquid titanium compound, and optionally
    (d) a precipitating agent,
  wherein at least one of said components (a), (b), (c) and (d) contains a halogen-containing compound, and
  (B) an organometallic compound containing a metal selected from Group I to Group III of the periodic table; and

[II] an organometallic compound catalyst component containing a metal selected from Group I to Group III of the periodic table.

According to the process for preparing an ethylene polymer of the present invention, an ethylene polymer having the above-mentioned properties (i) to (vii) can be obtained.

The solid titanium catalyst component for ethylene polymerization of the invention is obtained by the contact with each other of oxygen and a solid titanium organometallic compound complex which is obtained by the contact with each other of
  (A) a solid titanium composite containing titanium, magnesium, halogen and a compound having at least two ether linkages present through plural atoms, which is obtained by the contact with each other of
    (a) a liquid magnesium compound having no reduction ability,
    (b) a compound having at least two ether linkages present through plural atoms, and
    (c) a liquid titanium compound, and optionally
    (d) a precipitating agent,
  wherein at least one of said components (a), (b), (c) and (d) contains a halogen-containing compound, and
  (B) an organometallic compound containing a metal selected from Group I to Group III of the periodic table.

The ethylene polymerization catalyst of the invention comprises:

[I] the above-mentioned solid titanium catalyst component, and

[II] an organometallic compound catalyst component containing a metal selected from Group I to Group III of the periodic table.

The solid titanium catalyst component for ethylene polymerization and the ethylene polymerization catalyst containing the solid titanium catalyst component are favorably used for preparing the above-mentioned ethylene polymer.

BRIEF DESCRIPTION OF THE DRAWING

FIGURE is an explanatory view showing steps of a process for preparing an ethylene polymerization catalyst according to the present invention.

DETAILED DESCRIPTION OF THE INVENTION

The ethylene polymer, the process for preparing the polymer, the solid titanium catalyst component for ethylene polymerization and the ethylene polymerization catalyst, according to the invention, will be described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

The ethylene polymer of the invention is a homopolymer of ethylene, a random copolymer of ethylene and an olefin, or a block copolymer of ethylene and an olefin.

The copolymer of ethylene and an olefin may contain constituent units derived from α-olefins of 3 to 20 carbon atoms, such as propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene, in amounts of 10% by weight or less, preferably 5% by weight or less.

The copolymer may further contain constituent units derived from compounds having a large number of unsaturated bonds, for example, aromatic vinyl compounds such as styrene and allylbenzene, alicyclic vinyl compounds such as vinylcyclohexane, cycloolefins such as cyclopentene, cycloheptene, norbornene, 5-methyl-2-norbornene, tetracyclododecene and 2-methyl-1,4,5,8-dimethano-1,2,3,4,4a,5, 8,8a-octahydronaphthalene, and dienes (conjugated dienes and non-conjugated dienes) such as 6-methyl-1,6-octadiene, 7-methyl-1,6-octadiene, 6-ethyl-1,6-octadiene, 6-propyl-1, 6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1, 6-decadiene, 6-methyl-1,6-undecadiene, isoprene and butadiene, in amounts of 10% by weight or less, preferably 5% by weight or less.

The ethylene polymer of the invention has a density of 0.90 to 0.98 g/cm³, preferably 0.92 to 0.98 g/cm³, more preferably 0.94 to 0.98 g/cm³.

The density is measured as follows. A sample (strand having a length of 5 to 6 cm) after measured on the melt flow rate is placed in a constant temperature oil bath of 120° C. and kept therein for one hour. Then, water is little by little introduced into the oil bath and the bath is cooled from 120° C. to room temperature over one hour. Thereafter, the sample is allowed to stand indoors at 23° C. for one hour, and the sample is cut to give two small strips (specimens). After the specimens are wetted with methanol, they are gently put into a density gradient tube. After 15 minutes, the positions of the specimens are read out from the scale of the density gradient tube to determine an average value of the two specimens. The average value is reduced to a density from the calibration curve of the density and the scale of the density gradient tube drawn using a standard float. The standard float is a spherical glass having a diameter of 3 to 5 mm, which is obtained by sealing one end of a glass capillary having a diameter of 1 to 2 mm, temporarily fusion bonding a nichrome wire to the sealed end of the capillary, cutting the capillary at the position of about 2 mm distance from the sealed end, holding the capillary thus cut with the nichrome wire, and swelling it by heating. The liquid in the density gradient tube is a mixture obtained by mixing methanol of reagent first grade defined by JIS K1501 with an aqueous solution of sodium acetate prepared using sodium acetate of reagent first grade defined by JIS K8371.

The ethylene polymer of the invention has a melt flow rate of 0.001 to 3,000 g/10 min, preferably 0.005 to 1,000 g/10 min, more preferably 0.01 to 100 g/10 min, most preferably 0.02 to 10 g/10 min.

The melt flow rate is measured as follows. An orifice having a size as defined by JIS K7210 is fitted to an automatic MFR measuring instrument produced by Tester Sangyo K.K. in accordance with JIS K7210. The barrel (place where a sample is introduced) is heated to 190° C. and kept at the same temperature. Into the barrel is introduced 4 g of a sample, and a piston is equipped in the barrel. Then, air bubbles are removed, and the barrel is preheated for 6 minutes. After the preheating, a load of 2,160 g is applied to push out the sample. The weight of the sample pushed out of the barrel per 10 minutes is measured, and the value thus measured is taken as a melt flow rate.

In the ethylene polymer of the invention, the melt tension (MT) and the melt flow rate (MFR) satisfy the relationship represented by the formula:

$$\log MT < -0.41 \log MFR + 0.75,$$

preferably $\log MT < -0.41 \log MFR + 0.745$.

The melt tension is determined by measuring a stress given when a molten ethylene polymer is stretched at a fixed rate. That is, the melt tension is measured using an MT measuring machine produced by Toyo Seiki Seisakusho K.K. under the conditions of a resin temperature of 190° C., an extrusion speed of 15 mm/min, a take-up speed of 10 to 20 m/in, a nozzle diameter of 2.09 mm and a nozzle length of 8 mm.

The ethylene polymer of the invention has a molecular weight distribution Mw/Mn (i.e., a ratio of a weight-average molecular weight (Mw) to a number-average molecular weight (Mn)) of 2 to 9, preferably 3 to 8, more preferably 4 to 7, and has a molecular weight distribution Mz/Mw (i.e., a ratio of a Z average molecular weight (Mz) to a weight-average molecular weight (Mw)) of 2 to 5, preferably 2.5 to 4.5, more preferably 3 to 4.

The ethylene polymer having values of Mw/Mn and Mz/Mw in the above ranges shows a narrow molecular weight distribution and has a low content of a polymer having a molecular weight extremely larger than the average molecular weight. Hence, a molded article obtained from such polymer does not occur any poor appearance such as fish eye.

The Mw/Mn and the Mz/Mw are measured in the following manner using a gel permeation chromatography (GPC).

Apparatus

ALC/GPC 150C model, produced by Milipore Co.

Measuring conditions

Column: GMH-HT6 (7.5 mmID×60 cm), produced by Toso K.K.

Mobile phase: o-Dichlorobenzene (ODCB)

Column temperature: 138° C.

Flow rate: 1.0 ml/min

Concentration of sample: 30 mg/20 ml

Solution temperature: 140° C.

Amount of influent: 500 ml

Detector: differential refractometer

Determination of Mw/Mn and Mz/Mw

The elution time $R_{ti}$, the eluate quantity $H_i$, the molecular weight $M_i$, the number of macromolecules $N_i$ in the i section of the GPC elution curve have the following relation:

$$M_i = (j_i/K)^{1/\alpha+1}$$

$$(K=2.0922\times10^{-4}, \alpha=0.735)$$

$$j_i = P(1) + P(2)R_{ti} + P(3)R_{ti}^2 + P(4)R_{ti}^3$$

$$H_i = M_i N_i$$

wherein P(1), P(2), P(3) and P(4) are values obtained through calculation from the calibration curve indicating a relation between the eluate quantity and the molecular weight obtained by the GPC measurement of a sample of standard polystyrene (Mw/Mn=1.1) under the above measuring conditions.

From the values of Mi and Hi thus obtained, Mn, Mw and Mz are calculated by the following formulas to determine Mw/Mn and Mz/Mw.

$$Mn = \Sigma H_i / \Sigma(H_i/M_i)$$

$$Mw = \Sigma H_i M_i / \Sigma H_i$$

$$MZ = \Sigma H_i M_i^2 / \Sigma H_i M_i$$

[See Pollock, D., and Kratz, F. F.: GPC Sixth International Seminar (1968), and Mori, Sadao: "Size Exclusion Chromatography", pp.51–56, Published on Dec. 1, 1991 (Kyoritsu Shuppan)].

The g* value of the ethylene polymer of the invention, which is an index of the proportion of long-chain branches, is in the range of 0.90 to 1.00, preferably 0.92 to 1.00, more preferably 0.95 to 1.00.

The ethylene polymer having a g* value in the above range has a small proportion of the long-chain branches in the polymer, and hence a molded article obtained therefrom is excellent in rigidity and impact resistance.

The g* value is determined in the following manner using GPC. That is, the values $M_i$ and $H_i$ are measured under the same measuring conditions as described above. Then, a value of $[\eta]_{GPC}{}^{ODCB}$ is calculated by the following formula:

$$[\eta]_{GPC}{}^{ODCB} = K(\Sigma H_i(M_i)\alpha/\Sigma H_i)$$

wherein K, α, $H_i$ and $M_i$ are the same as defined above.

The obtained value is corrected to a value ($[\eta]_{GPC}$) given in a decalin solvent in accordance with a literature "GPC Sixth International Seminar" by Pollock, D., and Kratz, F. F., 1968. Further, each sample is also measured on the intrinsic viscosity ($[\eta]_{obs}$) at 135° C. in a decalin solvent.

Using the values thus obtained, the g* value is calculated by the following formula.

$$g^* = [\eta]_{obs}/[\eta]_{GPS}$$

The ethylene polymer of the invention has a swell ratio (SR) of 1.35 or more, preferably 1.35 to 1.50.

The ethylene polymer having a swell ratio in the above range is excellent in moldability.

For example, when a bottle is produced from such an ethylene polymer by hollow molding, the shape of pinch-off scar is improved, and hence the resulting bottle has an excellent mechanical strength. Further, since the thickness distribution of the hollow molded article can be narrowed, the amount of the bottle material per one bottle can be reduced, and moreover the buckling strength of the bottle can be increased when the same amount of the material is used.

The swell ratio is measured as follows. A nozzle having a diameter ($D_0$) of 3.0 mm and a length (L) of 3 mm is fitted to Capirograph-IB produced by Toyo Seiki Seisakusho K.K. The barrel (place where a sample is introduced) is heated to 190° C. and kept at the same temperature. Into the barrel is introduced 10 g of a sample, and a piston is equipped in the barrel. Then, air bubbles are removed, and the barrel is preheated for 6 minutes. After the preheating, the sample is extruded at shear rates of 0.25, 0.5, 1, 2.5, 5, 10 and 25 $sec^{-1}$, and a diameter ($D_i$) of the strand 15 mm below the nozzle tip is measured using a laser beam. Then, a ratio ($SR_i$, $R_i/D_0$) of the strand diameter ($D_i$) thus measured to the nozzle diameter ($D_0$) is determined.

From the curve obtained by plotting the $SR_i$ for each shear rate on a semi-logarithmic paper, a value at the shear rate of 9.98 $sec^{-1}$ is read out and taken as a swell ratio.

The ethylene polymer of the invention has a high melt tension, a high swell ratio, a narrow molecular weight distribution and a small amount of long-chain branches. Such an ethylene polymer has not been found yet so far.

Since the ethylene polymer of the invention has the above-mentioned properties, it is excellent in moldability. Further, the molded article obtained from the polymer is excellent in rigidity and impact resistance and free from occurrence of poor appearance. This ethylene polymer can be favorably used as a material of various molded articles such as a hollow molded article and an extrusion molded article.

When the ethylene polymer of the invention is used as a material of the hollow molded article, the polymer preferably has the following properties that:

the density is in the range of 0.94 to 0.97 $g/cm^3$;

the melt flow rate, as measured at 190° C. under a load of 2.16 kg, is in the range of 0.01 to 10 g/10 min;

the melt tension (MT) and the melt flow rate (MFR) satisfy the relationship represented by the formula:

log $MT < -0.41$ log $MFR + 0.75$;

the molecular weight distribution Mw/Mn is in the range of 3 to 8;

the molecular weight distribution Mz/Mw is in the range of 2.5 to 4.5;

the g* value is in the range of 0.95 to 1.00; and the swell ratio is in the range of 1.35 to 1.50.

When the ethylene polymer of the invention is used as a material of the extrusion molded article, the polymer preferably has the following properties that:

the density is in the range of 0.94 to 0.97 $g/cm^3$;

the melt flow rate, as measured at 190° C. under a load of 2.16 kg, is in the range of 0.01 to 10 g/10 min; the melt tension (MT) and the melt flow rate (MFR) satisfy the relationship represented by the formula:

log $MT < -0.41$ log $MFR + 0.75$;

the molecular weight distribution Mw/Mn is in the range of 3 to 8;

the molecular weight distribution Mz/Mw is in the range of 2.5 to 4.5;

the g* value is in the range of 0.95 to 1.00; and the swell ratio is in the range of 1.35 to 1.50.

The ethylene polymer of the invention as mentioned above can be prepared by homopolymerizing ethylene or copolymerizing ethylene and other olefin than ethylene in the presence of an ethylene polymerization catalyst which will be described hereinafter.

The solid titanium catalyst component for ethylene polymerization of the invention can be obtained by the contact with each other of oxygen and a solid titanium organometallic compound complex which is obtained by the contact with each other of (A) a solid titanium composite containing titanium, magnesium, halogen and a compound having at least two ether linkages present through plural atoms, which is obtained by the contact with each other of
  (a) a liquid magnesium compound having no reduction ability,
  (b) a compound having at least two ether linkages present through plural atoms, and
  (c) a liquid titanium compound, and optionally
  (d) a precipitating agent, wherein at least one of said components (a), (b), (c) and (d) contains a halogen-containing compound, and (B) an organometallic compound containing a metal selected from Group I to Group III of the periodic table.

The ethylene polymerization catalyst of the invention comprises:

[I] the above-mentioned solid titanium catalyst component, and

[II] an organometallic compound catalyst component containing a metal selected from Group I to Group III of the periodic table.

For preparing the solid titanium catalyst component of the invention, the liquid magnesium compound having no reduction ability (a), the compound having at least two ether linkages present through plural atoms (b) and the liquid titanium compound (c), and optionally, the precipitating agent (d) are first brought into contact with each other to prepare a solid titanium composite (A) containing titanium, magnesium, halogen and the compound having at least two ether linkages present through plural atoms.

The liquid magnesium compound having no reduction ability (a) used for preparing the solid titanium composite (A) is either a liquid magnesium compound, a magnesium compound solution obtained by dissolving a liquid magnesium compound in a solvent having solubility for a liquid magnesium compound, or a magnesium compound solution obtained by dissolving a solid magnesium compound in a solvent having a solubility for a solid magnesium compound.

The magnesium compound having no reduction ability (a) may be one derived from a magnesium compound having reduction ability.

Examples of the magnesium compounds (a) include magnesium halides such as magnesium chloride, magnesium bromide, magnesium iodide and magnesium fluoride; alkoxymagnesium halides such as methoxymagnesium chloride, ethoxymagnesium chloride, isopropoxymagnesium chloride, butoxymagnesium chloride and octoxymagnesium chloride; aryloxymagnesium halides such as phenoxymagnesium chloride and methylphenoxymagnesium chloride; alkoxymagnesiums such as ethoxymagnesium, isopropoxymagnesium, butoxymagnesium, octoxymagnesium and 2-ethylhexoxymagnesium; aryloxymagnesiums such as phenoxymagnesium and dimethylphenoxymagnesium; magnesium carboxylates such as magnesium laurate and magnesium stearate; and inorganic acid salts such as magnesium carbonate, magnesium borate and magnesium silicate. The magnesium compounds may be a complex compound of any of the above compounds and other metal, a composite compound of any of the above compounds and other metal, a mixture of any of the above compounds and other metal compound, or a mixture of two or more of the above compounds. Of these, preferred are magnesium halides, and particularly preferred is magnesium chloride. The magnesium compound having no reduction ability may be derived from other substance.

When the magnesium compound is solid, it is dissolved in a solvent having solvility for a magnesium compound and the resulting solution is used as the liquid magnesium compound having no reduction ability (a). When the magnesium compound is liquid, it can be per se used as the liquid magnesium compound having no reduction ability (a), or it can be used by dissolving it in a solvent having solubility for a magnesium compound.

Examples of the solvents having solubility for a magnesium compound include titanates and electron donors (g) such as alcohols, aldehydes, amines, carboxylic acids and metallic acid esters (excluding titanates). These compounds may be used alone or in combination.

Examples of the titanates include orthotitanates such as methyl orthotitanate, ethyl orthotitanate, n-propy orthotitanate, i-propyl orthotitanate, n-butyl orthotitanate, i-butyl orthotitanate, n-amyl orthotitanate, 2-ethylhexyl orthotitanate, n-octyl orthotitanate, pheny orthotitanate and cyclohexyl orthotitanate; and polytitanates such as methyl polytitanate, ethyl polytitanate, n-propyl polytitanate, i-propyl polytitanate, n-butyl polytitanate, i-butyl polytitanate, n-amyl polytitanate, 2-ethylhexyl polytitanate, n-octyl polytitanate, phenyl polytitanate and cyclohexy polytitanate.

Examples of the alcohols include aliphatic alcohols such as methanol, ethanol, propanol, butanol, ethylene glycol, methyl carbitol, 2-methylpentanol, 2-ethylbutanol, n-heptanol, n-octanol, 2-ethylhexanol, decanol, dodecanol, tetradecyl alcohol, undecenol, oleyl alcohol and stearyl alcohol; alicyclic alcohols such as cyclohexanol and methylcyclohexanol; aromatic alcohols such as benzyl alcohol, methylbenzyl alcohol, isopropylbenzyl alcohol, α-methylbenzyl alcohol and α,α-dimethylbenzyl alcohol; and aliphatic alcohols containing alkoxy group such as n-butyl cellosolve and 1-butoxy-2-propanol.

Examples of the aldehydes include aldehydes of 7 or more carbon atoms such as caproic aldehyde, 2-ethylhexylaldehyde, caprylic aldehyde and undecylenic aldehyde.

Examples of the amines include amines of 6 or more carbon atoms such as heptylamine, octylamine, nonylamine, decylamine, laurylamine, undecylamine and 2-ethylhexylamine.

Examples of the carboxylic acids include organic carboxylic acids of 7 or more carbon atoms such as caprylic acid, 2-ethylhexanoic acid, undecylenic acid, undecanoic acid, nonylic acid and octanoic acid.

Examples of the metallic acid esters include zirconium tetraalkoxides such as zirconium tetramethoxide, zirconium tetraethoxide, zirconium tetrabutoxide and zirconium tetrapropoxide.

These titanates and electron donors (g) can be used together with inert solvents.

Examples of the inert solvents include:

aliphatic hydrocarbons, such as propane, butane, pentane, hexane, heptane, octane, decane, dodecane and kerosine;

allcyclic hydrocarbons, such as cyclopentane, cyclohexane and methylcyclopentane;

aromatic hydrocarbons, such as benzene, toluene and xylene;

halogenated hydrocarbons, such as ethylene chloride and chlorobenzene; and mixtures of these hydrocarbons.

In the liquid obtained by dissolving the magnesium compound in the solvent having solubility for magnesium compounds, the magnesium compound is contained in an amount of 0.1 to 20 mol/liter-solvent, preferably 0.5 to 5 mol/liter-solvent.

In the preparation of the solid titanium composite (A), the compound having at least two ether linkages present through plural atoms (b) is used in addition to the liquid magnesium compound having no reduction ability (a).

As the compound having at least two ether linkages present through plural atoms (b) (hereinafter sometimes referred to as "diether compound (b)") used for preparing the solid titanium catalyst component, there can be mentioned compounds wherein one or more kinds of atoms selected from carbon, silicon, oxygen, nitrogen, phosphorus, boron and sulfur are present among those ether linkages. Preferred are compounds wherein relatively bulky substituents are bonded to the atoms present among the ether linkages and the atoms present among the two or more ether linkages contain plural carbon atoms. As the unit linking the two ether oxygen in these compounds, ethylene and propylene are preferred.

The diether compound (b) is, for example, an ether compound represented by the following formula:

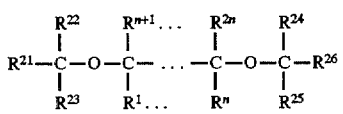

wherein n is an integer of 2≦n≦10, $R^1$ to $R^{26}$ are each a substituent having at least one element selected from carbon, hydrogen, oxygen, halogen, nitrogen, sulfur, phosphorus, boron and silicon, an arbitrary combination of $R^1$ to $R^{26}$, preferably $R^1$ to $R^{2n}$, may form a ring other than a benzene ring in cooperation, and the main chain may contain an atom other than carbon.

Listed below are examples of the diether compounds (b).
2-(2-Ethylhexyl)-1,3-dimethoxypropane,
2-Isopropyl-1,3-dimethoxypropane,
2-Butyl-1,3-dimethoxypropane,
2-s-Butyl-1,3-dimethoxypropane,
2-Cyclohexyl-1,3-dimethoxypropane,
2-Phenyl-1,3-dimethoxypropane,
2-Cumyl-1,3-dimethoxypropane,
2-(2-Phenylethyl)-1,3-dimethoxypropane,
2-(2-Cyclohexylethyl)-1,3-dimethoxypropane,
2-(p-Chlorophenyl)-1,3-dimethoxypropane,
2-(Diphenylmethyl)-1,3-dimethoxypropane,
2-(1-Naphthyl)-1,3-dimethoxypropane,
2-(2-Fluorophenyl)-1,3-dimethoxypropane,
2-(1-Decahydronaphthyl)-1,3-dimethoxypropane,
2-(p-t-Butylphenyl)-1,3-dimethoxypropane,
2,2-Dicyclohexyl-1,3-dimethoxypropane,
2,2-Diethyl-1,3-dimethoxypropane,
2,2-Dipropyl-1,3-dimethoxypropane,
2,2-Dibutyl-1,3-dimethoxypropane,
2-Methyl-2-propyl-1,3-dimethoxypropane,
2-Methyl-2-benzyl-1,3-dimethoxypropane,
2-Methyl-2-ethyl-1,3-dimethoxypropane,
2-Methyl-2-isopropyl-1,3-dimethoxypropane,
2-Methyl-2-phenyl-1,3-dimethoxypropane,
2-Methyl-2-cyclohexyl-1,3-dimethoxypropane,
2,2-Bis(p-chlorophenyl)-1,3-dimethoxypropane,
2,2-Bis(2-cyclohexylethyl)-1,3-dimethoxypropane,
2-Methyl-2-isobutyl-1,3-dimethoxypropane,
2-Methyl-2-(2-ethylhexyl)-1,3-dimethoxypropane,
2,2-Diisobutyl-1,3-dimethoxypropane,
2,2-Diphenyl-1,3-dimethoxypropane,
2,2-Dibenzyl-1,3-dimethoxypropane,
2,2-Bis(cyclohexylmethyl)-1,3-dimethoxypropane,
2,2-Diisobutyl-1,3-diethoxypropane,
2,2-Diisobutyl-1,3-dibutoxypropane,
2-Isobutyl-2-isopropyl-1,3-dimethoxypropane,
2,2-Di-s-butyl-1,3-dimethoxypropane,
2,2-Di-t-butyl-1,3-dimethoxypropane,
2,2-Dineopentyl-1,3-dimethoxypropane,
2-Isopropyl-2-isopentyl-1,3-dimethoxypropane,
2-Phenyl-2-benzyl-1,3-dimethoxypropane,
2-Cyclohexyl-2-cyclohexylmethyl-1,3-dimethoxypropane,
2,3-Diphenyl-1,4-diethoxybutane,
2,3-Dicyclohexyl-1,4-diethoxybutane,
2,2-Dibenzyl-1,4-diethoxybutane,
2,3-Dicyclohexyl-1,4-diethoxybutane,
2,3-Diisopropyl-1,4-diethoxybutane,
2,2-Bis (p-methylphenyl)-1, 4-dimethoxybutane,
2,3-Bis(p-chlorophenyl)-1, 4-dimethoxybutane,
2,3-Bis(p-fluorophenyl)-1, 4-dimethoxybutane,
2,4-Diphenyl-1,5-dimethoxypentane,
2,5-Diphenyl-1,5-dimethoxyhexane,
2,4-Diisopropyl-1,5-dimethoxypentane,
2,4-Diisobutyl-1,5-dimethoxypentane,
2,4-Diisoamyl-1,5-dimethoxypentane,
3-Methoxymethyltetrahydrofuran,
3-Methoxymethyldioxane,
1,2-Diisobutoxypropane,
1,2-Diisobutoxyethane,
1,3-Diisoamyloxyethane,
1,3-Diisoamyloxypropane,
1,3-Diisoneopentyloxyethane,
1,3-Dineopentyloxypropane,
2,2-Tetramethylene-1,3-dimethoxypropane,
2,2-Pentamethylene-1,3-dimethoxypropane,
2,2-Hexamethylene-1,3-dimethoxypropane,
1,2-Bis(methoxymethyl)cyclohexane,
2,8-Dioxaspiro[5,5]undecane,
3,7-Dioxabicyclo[3,3,1]nonane,
3, 7-Dioxabicyclo[3,3,0]octane,
3,3-Diisobutyl-1,5-oxonanane,
6,6-Diisobutyloxyheptane,
1,1-Dimethoxymethylcyclopentane,
1,1-Bis(dimethoxymethyl)cyclohexane,
1,1-Bis(methoxymethyl)bicyclo[2,2,1]heptane,
1,1-Dimethoxymethylcyclopentane,
2-Methyl-2-methoxymethyl-1,3-dimethoxypropane,
2-Cyclohexyl-2-ethoxymethyl-1,3-diethoxypropane,
2-Cyclohexyl-2-methoxymethyl-1,3-dimethoxypropane,
2,2-Diisobutyl-1,3-dimethoxycyclohexane,
2-Isopropyl-2-isoamyl-1,3-dimethoxycyclohexane,
2-Cyclohexyl-2-methoxymethyl-1,3-dimethoxycyclohexane,
2-Isopropyl-2-methoxymethyl-1,3-dimethoxycyclohexane,
2-Isobutyl-2-methoxymethyl-1,3-dimethoxycyclohexane,
2-Cyclohexyl-2-ethoxymethyl-1,3-diethoxycyclohexane,
2-Cyclohexyl-2-ethoxymethyl-1,3-dimethoxycyclohexane,
2-Isopropyl-2-ethoxymethyl-1,3-diethoxycyclohexane,
2-Isopropyl-2-ethoxymethyl-1,3-dimethoxycyclohexane,
2-Isobutyl-2-ethoxymethyl-1,3-diethoxycyclohexane,
2-Isobutyl-2-ethoxymethyl-1,3-dimethoxycyclohexane,
Tris(p-methoxyphenyl)phosphine,
Methylphenylbis(methoxymethyl)silane,
Diphenylbis(methoxymethyl)silane,
Methylcyclohexylbis(methoxymethyl)silane,
Di-t-butylbis(methoxymethyl)silane,
Cyclohexyl-t-butylbis(methoxymethyl)silane, and
i-Propyl-t-butylbis(methoxymethyl)silane.

Of these, preferred are 1,3-diethers, and particularly preferred are 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane.

The liquid titanium compound (c) used for preparing the solid titanium composite (A) is, for example, a tetravalent halogen-containing titanium compound represented by the following formula:

$$Ti(OR)_gX_{4-g}$$

wherein R is a hydrocarbon group, X is a halogen atom, and g is a number of 0<g<4.

Particular examples of such compounds include:

titanium tetrahalides, such as $TiCl_4$, $TiBr_4$, $TiI_4$;

alkoxytitanium trihalides, such as Ti $(OCH_3)$ $Cl_3$, Ti $(OC_2H_5)$ $Cl_3$, Ti $(On-C_4H_9)$ $Cl_3$, Ti $(OC_2H_5)$ $Br_3$ and Ti $(OisoC_4H_9)$ $Br_3$;

alkoxytitanium dihalides, such as Ti $(OCH_3)_2Cl_2$, Ti $(OC_2H_5)_2Cl_2$, Ti $On-C_4H_9)_2Cl_2$ and Ti $(OC_2H_5)_2Br_2$;

alkoxytitanium monohalides, such as Ti $(OCH_3)_3Cl$, Ti $(OC_2H_5)_3Cl$, Ti $(On-C_4H_9)_3Cl$ and Ti $(OC_2H_5)_3Br$; and tetraalkoxytitaniums, such as Ti $(OCH_3)_4$, Ti $(OC_2H_5)_4$, Ti $On-C_4H_9)_4$, Ti $(Oiso-C_4H9)_4$ and Ti $(O-2-ethylhexyl)_4$.

Of these, preferred are titanium tetrahalides, and particularly preferred is titanium tetrachloride. These titanium compounds may be used alone or in combination. Further, they may be used by diluting them with hydrocarbons or halogenated hydrocarbons.

The precipitating agent (d) which may be used optionally in the preparation of the solid titanium composite (A) is, for example, a silicon compound.

Examples of the silicon compounds include:

a halogen-containing silicon compound represented by the formula:

$$SiX_nR^q_{4-n}$$

wherein X is a halogen atom, $R^q$ is an alkyl group of 1 to 20 carbon atoms, a cycloalkyl group of 3 to 20 carbon atoms or an aryl group of 6 to 20 carbon atoms, and n is a real number of 1 to 4, and a high-molecular silicon compound represented by the formula:

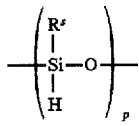

wherein $R^s$ is a hydrocarbon group, and p is an integer of or more.

Particular examples of the halogen-containing silicon compounds represented by the formula $SiX_nR^q_{4-n}$ are described below.

Tetrahalosilanes represented by the formula $SiX_4$ (n=4 in the above formula), for example, tetrachlorosilane, tetrabromosilane, tetraiodosilane, tetrafluorosilane, trichlorobromosilane, trichloroiodosilane, trichlorofluorosilane, dichlorodibromosilane, dichlorodiiodosilane, dichlorodifluorosilane, chlorotribromosilane, chlorotriiodosilane, chlorotrifluorosilane, bromotriiodosilane, bromotrifluorosilane, dibromodiiodosilane, dibromodifluorosilane, tribromoiodosilane, tribromofluorosilane, iodotrifluorosilane, diiododifluorosilane and triiodofluorosilane. Of these, preferred are tetrachlorosilane, tetrabromosilane, trichlorobromosilane, dichlorodibromosilane and chlorotribromosilane, and most preferred is tetrachlorosilane.

Compounds represented by the general formula $SiX_3R^q$ (n=3 in the above formula), for example:

alkyltrichlorosilanes containing saturated alkyl groups of up to 16 carbon atoms, such as methyltrichlorosilane, ethyltrichlorosilane, n- or i-propyltrichlorosilane, n-, i-, sec- or tert-butyltrichlorosilane, n- or i-amyltrichlorosilane, n-hexyltrichlorosilane, n-heptyltrichlorosilane, n-octyltrichlorosilane, n-dodecyltrichlorosilane, n-tetradecyitrichlorosilane and n-hexadecyltrichlorosilane;

unsaturated alkyltrichlorosilanes containing unsaturated alkyl group of 1 to 4 carbon atoms, such as vinyltrichlorosilane and isobutenyltrichlorosilane;

saturated or unsaturated haloalkyltrichlorosilanes such as chloromethyltrichlorosilane, dichloromethyltrichlorosilane, trichloromethyltrichlorosilane, (2-chloroethyl)trichlorosilane, (1,2-dibromoethyl)trichlorosilane, trifluoromethyltrichlorosilane and (vinyl-1-chloro)trichlorosilane;

saturated or unsaturated cyloalkyltrichlorosilanes, such as cyclopropyltrichlorosilane, cyclopentyltrichlorosilane, cyclohexenyltrichlorosilane and 3-cyclohexenyltrichlorosilane;

aryl or araikyltrichlorosilane, such as phenyltrichlorosilane, 2-, 3- or 4-tolyltrichlorosilane and benzyltrichlorosilane; and alkyl, aryl or haloalkyl mixed trihalositanes, such as methyldifluorochlorosilane, methylfluorodichlorosilane, ethyldifluorochlorosilane, ethylfluorodichlorosilane, n- or i-propyldifluorochlorosilane, n-butyldifluorochlorosilane, n-butylfluorodichtorosilane, phenyldifluorochlorosilane, methyldichlorobromosilane, ethyldichlorobromosilane, methyldichloroiodosilane and (trifluromethyl)difluorobromosilane.

Compounds represented by the general formula $SiX_2P^q_2$ (n=2 in the above formula), for example:

dialkyldihalosilanes, such as dimethyldichlorosilane, diethyldichlorosilane, di-n- or di-i-propyldichlorosilane, di-n-, di-i-, di-sec- or di-tert-butyldichlorosilane, di-n- or di-i-amyldichlorosilane, di-n-hexyldichlorosilane, di-n-heptyldichlorosilane and di-n-octyldichlorosilane;

dicycloalkyldihalosilanes, such as dicyclopentyldichlorosilane, dicyclohexyldichlorosilane, dicyclohexyldibromosilane, dicyclohexyldiiodosilane and dicyclohexyldifluorosilane; and diaryl or diaralkyldihalosilanes, such as diphenyldichlorosilane, di-2-, di-3- or di-4-tolyldichlorosilane and dibenzyldichlorosilane.

Compounds represented by the general formula $SiXP^q_3$ (n=1 in theabove formula), for example:

trialkylhalosilanes, such as trimethylchlorosilane, triethylchlorosilane, tri(n- or i-propyl)chlorosilane, tri(n- or i-butyl)chlorosilane, tri(n-hexyl)chlorosilane, tri(n-heptyl)chlorosilane, tri(n-octyl)chlorosilane, dimethyl(ethyl)chlorosilane and methyl(diethyl)chlorosilane; and triaryl or triaralkylhalosilanes, such as triphenylchlorosilane, tri(2-, 3- or 4-tolyl)chlorosilane and tribenzylchlorosilane.

Of these compounds, preferred are tetrachlorosilane and monochlorosilane, dichlorosilane and trichlorosilane of the above formula wherein $R^q$ is methyl, ethyl or phenyl.

Examples of the high-molecular silicon compounds include methylhydropolysiloxane, ethylhydropolysiloxane, phenylhydropolysiloxane and cyclohexylhydropolysiloxane. These compounds may be used alone or in combination.

Of the above compounds, particularly preferred are tetrachlorosilane and methylhydropolysiloxane.

There is no specific limitation on the polymerization degree of the high-molecular silicon compound, but preferably used are compounds having a viscosity of about 10 to 100 cSt from the viewpoint of practical use. The terminal structure of the high-molecular silicon compound does not have great influence on the catalytic performance, but it is preferred that the terminal is sealed with an inert group.

Another example of the precipitating agent (d) is an organometallic compound [II] which will be described later.

It is unnecessary to use the precipitating agent (d) when other component functions as a precipitating agent.

In the preparation of the solid titanium composite (A), the liquid magnesium compound having no reduction ability (a), the diether compound (b) and the liquid titanium compound (c), and if desired, the precipitating agent (d) are employed, but in addition thereto a carrier compound, a halogen-containing compound and an electron donor other than the diether compound (b) may be further employed.

Examples of the carrier compounds employable herein include metallic oxides such as $Al_2O_3$, $SiO_2$, $B_2O_3$, MgO, CaO, $TiO_2$, ZnO, $ZnO_2$, $SnO_2$, BaO and ThO, and resins such as a styrene-divinylbenzene copolymer. Of these, preferred are $Al_2O_3$, $SiO_2$ and the styrene-divinylbenzene copolymer.

Examples of the halogen-containing compounds include the aforementioned halogen-containing silicon compounds and halogen-containing alcohols such as 2-chloroethanol, 1-chloro-2-propanol, 3-chloro-1-propanol, 1-chloro-2-methyl-2-propanol, 4-chloro-1-butanol, 5-chloro-1-pentanol, 6-chloro-1-hexanol, 3-chloro-1,2-propanediol, 2-chlorocyclohexanol, 4-chlorobenzhydrol, (m,o,p)-chlorobenzyl alcohol, 4-chlorocatechol, 4-chloro-(m,o)-cresol, 6-chloro-(m,o)-cresol, 4-chloro-3,5-dimethylphenol, chlorohydroquinone, 2-benzyl-4-chlorophenol, 4-chloro-1-naphthol, (m,o,p)-chlorophenol, p-chloro-α-methylbenzyl alcohol, 2-chloro-4-phenylphenol, 6-chlorothymol, 4-chlororesorcinol, 2-bromoethanol, 3-bromo-1-propanol, 1-bromo-2-propanol, 1-bromo-2-butanol, 2-bromo-p-cresol, 1-bromo-2-naphthol, 6-bromo-2-naphthol, (m,o,p)-bromophenol, 4-bromoresorcinol, (m,o,p)-fluorophenol, p-iodophenol; 2,2-dichloroethanol, 2,3-dichloro-1-propanol, 1,3-dichloro-2-propanol, 3-chloro-1-(α-chloromethyl)-1-propanol, 2,3-dibromo-1-propanol, 1,3-dibromo-2-propanol, 2,4-dibromophenol, 2,4-dibromo-1-naphthol; 2,2,2-trichloroethanol, 1,1,1-trichloro-2-propanol, β,β,β-trichloro-tert-butanol, 2,3,4-trichlorophenol, 2,4,5-trichlorophenol, 2,4,6-trichlorophenol, 2,4,6-tribromophenol, 2,3,5-tribromo-2-hydroxytoluene, 2,3,5-tribromo-4-hydroxytoluene, 2,2,2-trifluoroethanol, α,α,α-trifluoro-m-cresol, 2,4,6-triiodophenol; 2,3,4,6-tetrachlorophenol, tetrachlorohydroquinone, tetrachlorobisphenol A, tetrabromobisphenol A, 2,2,3,3-tetrafluoro-1-propanol, 2,3,5,6-tetrafluorophenol and tetrafluororesorcinol.

Also employable as the halogen-containing compound are:

halogens in the element state, e.g., chlorine, bromine and iodine;

hydrogen halides, e.g., hydrogen chloride, hydrogen bromide and hydrogen iodide;

haloalkanes, e.g., carbon tetrachloride, chloroform, ethylene dichloride, ethylene tetrachloride, methylene chloride, trichlene, methyl chloride, ethyl chloride, n-butyl chloride and n-octyl chloride;

nonmetallic oxyhalides, e.g., sulfuryl chloride, thionyl chloride, nitrosyl chloride, phosphorus oxychloride and phosgene;

nonmetallic halides, e.g., phosphorus trichloride and phosphorus pentachloride; and metallic halides and ammonium halides, e.g., aluminum chloride and ammonium chloride.

Examples of the electron donors (e) other than the diether compound (b), which may be used for the preparation of the solid titanium composite (A), include organic acid esters, organic acid halides, organic acid anhydrides, ethers, ketones, aldehydes, tertiary amines, phosphites, phosphates, phosphoric amides, carboxylic amides and nitriles.

Particular examples thereof include:

ketones of 3 to 15 carbon atoms, such as acetone, methyl ethyl ketone, methyl isobutyl ketone, acetophenone, benzophenone, cyclohexanone and benzoquinone;

aldehydes of 2 to 15 carbon atoms, such as acetaldehyde, propionaldehyde, octylaldehyde, benzaldehyde, tolualdehyde and naphthaldehyde;

organic acid esters of 2 to 18 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, coumarin, phthalide and ethylene carbonate;

acid halides of 2 to 15 carbon atoms, such as acetyl chloride, benzoyl chloride, toluyl chloride and anisoyl chloride;

ethers of 2 to 20 carbon atoms, such as methyl ether, ethyl ether, isopropyl ether, butyl ether, amyl ether, tetrahydrofuran, anisole and diphenyl ether;

acid amides, such as N,N-dimethylacetamide, N,N-diethylbenzamide and N,N-dimethyltoluamide;

tertiary amines, such as trimethylamine, triethylamine, tributylamine, tribenzylamine and tetramethylethylenediamine; and nitriles, such as acetonitrile, benzonitrile and trinitrile.

Of these, preferred are aromatic carboxylic acid esters.

The above-mentioned compounds may be used alone or in combination.

Also preferred as the organic acid esters are polycarboxylic acid esters. As the polycarboxylic acid esters, there can be exemplified compounds having structures represented by the following formulas:

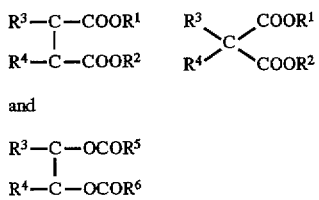

In the above formulas, $R^1$ is a substituted or unsubstituted hydrocarbon group, $R^2$, $R^5$ and $R^6$ are each hydrogen or a substituted or unsubstituted hydrocarbon group, and $R^3$ and $R^4$ are each hydrogen or a substituted or unsubstituted hydrocarbon group, preferably at least one of them being a substituted or unsubstituted hydrocarbon group. $R^3$ and $R^4$ may be bonded to each other to form a ring structure. When the hydrocarbon groups $R^1$ to $R^6$ are substituted, the substituents contain heteroatoms such as N, O and S, and have groups such as C—O—C, COOR, COOH, OH, $SO_3H$, —C—N—C— and $NH_2$.

Particular examples of such polycarboxylic acid esters include aliphatic polycarboxylic acid esters such as diethyl succinate, dibutyl succinate, diethyl methylsuccinate, diisobutyl α-methylglutarate, diethyl methylmalonate, diethyl ethylmalonate, diethyl isopropylmalonate, diethyl butylmalonate, diethyl phenylmalonate, diethyl diethylmalonate, diethyl dibutylmalonate, monooctyl maleate, dioctyl maleate, dibutyl maleate, dibutyl butylmaleate, diethyl butylmaleate, diisopropyl β-methylglutarate, diallyl ethylsuccinate, di-2-ethylhexyl fumarate, diethyl itaconate and dioctyl citraconate; alicyclic polycarboxylic acid esters such as diethyl 1,2-cyclohexanecarboxylate, diisobutyl 1,2-cyclohexanecarboxylate, diethyl tetrahydrophthalate and diethyl nadiate; aromatic polycarboxylic acid esters such as monoethyl phthalate, dimethyl phthalate, methylethyl phthalate, monoisobutyl phthalate, diethyl phthalate, ethylisobutyl phthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl phthalate, benzylbutyl phthalate, diphenyl phthlate, diethyl naphthalenedicarboxylate, dibutyl naphthalenedicarboxylate, triethyl trimellitate and dibutyl trimellitate; and heterocyclic polycarboxylic acid esters such as 3,4-furandicarboxylate.

Other examples of the polycarboxylic acid esters are long-chain dicarboxylic acid esters such as diethyl adipate, diisobutyl adipate, diisopropyl sebacate, di-n-butyl sebacate, di-n-octyl sebacate and di-2-ethylhexyl sebacate.

Of the above compounds, preferably used are the carboxylic acid esters, particularly preferably used are the polycarboxylic acid esters, and most preferably used are phthalic acid esters.

The electron donor (e) does not always require to be used as a starting material, and it can be produced in the course of preparing the solid titanium catalyst component.

The solid titanium composite (A) is prepared by bringing the liquid magnesium compound having no reduction ability (a), the diether compound (b) and the liquid titanium compound (c), and optionally, the precipitating agent (d), in addition, the carrier compound, the electron donor (e) and the halogen-containing compound into contact with each other. At least one component of the liquid magnesium compound having no reduction ability (a), the diether compound (b), the liquid titanium compound (c) and the precipitating agent (d) contains a halogen-containing compound.

There is no specific limitation on the process for preparing the solid titanium composite (A).

Examples of the processes for preparing the solid titanium composite (A) are described below.

(1) A process of causing the liquid magnesium compound having no reduction ability (a) to react with the liquid titanium compound (c) in the presence of the diether compound (b);

(2) A process of causing the liquid magnesium compound having no reduction ability (a) to react with the liquid titanium compound (c) in the presence of the diether compound (b) and the electron donor (e);

(3) A process of initially bringing the liquid magnesium compound having no reduction ability (a) into contact with the precipitating agent (d) and then causing the resulting precipitate to react with the diether compound (b) and the liquid titanium compound (c), and optionally, the electron donor (e);

(4) A process of initially bringing the liquid magnesium compound having no reduction ability (a) into contact with the precipitating agent (d) and then causing the resulting precipitate to react with the halogen-containing compound, the diether compound (b) and the liquid titanium compound (c), and optionally, the electron donor (e);

(5) A process of causing the reaction product obtained by any of the processes (1) to (4) to further react with the liquid titanium compound (c);

(6) A process of causing the reaction product obtained by any of the processes (1) to (4) to further react with the diether compound (b) and the liquid titanium compound (c); and (7) A process of causing the reaction product obtained by any of the processes (1) to (6) to further react with the diether compound (b).

The amounts of the components (a), (b), (c) and (d) used in the above processes to prepare the solid titanium composite (A) vary depending on the kind thereof, the contact conditions, the contact order, etc., but in general, the diether compound (b) is used in an amount of about 0.01 to 5 mol, preferably about 0.1 to 1 mol, based on 1 mol of the liquid magnesium compound having no reduction ability (a), and the liquid titanium compound (c) is used in an amount of 0.1 to 1,000 mol, preferably 1 to 200 mol, based on 1 mol of the liquid magnesium compound having no reduction ability (a). The precipitating agent (d) is used in an amount enough to form a solid product, and it is used in an amount of 0.1 to 1,000 mol, preferably 1 to about 200 mol, based on 1 mol of the liquid magnesium compound having no reduction ability (a).

The temperature at which these components (a), (b), (c) and (d) are brought into contact with each other is usually −70° to 200° C., preferably t0° to 150° C.

The solid titanium composite (A) obtained as above contains titanium, magnesium, halogen and the diether compound.

In the solid titanium composite (A), it is desired that an atomic ratio of halogen to titanium (halogen/titanium) is in the range of 2 to 100, preferably 4 to 90; a molar ratio of the diether compound (b) to titanium (diether compound (b)/titanium) is in the range of 0.01 to 100, preferably 0.2 to 10; and an atomic ratio of magnesium to titanium (magnesium/titanium) is in the range of 2 to 100, preferably 4 to 50.

The solid titanium catalyst component of the invention can be obtained by initially bringing the solid titanium composite (A) into contact with an organometallic compound (B) containing a metal selected from Group I to Group III of the periodic table to prepare a solid titanium organometallic compound complex and then further bringing this solid titanium organometallic compound complex into contact with oxygen.

Examples of the organometallic compound (B) containing a metal selected from Group I to Group III of the periodic table are identical with those of the organometallic compound catalyst component [II] containing a metal selected from group I to Group III of the periodic table, which will be described later.

As the oxygen used herein, there can be exemplified oxygen gas, air, ozone and organic peroxide.

The contact of the solid titanium composite (A) with the organometallic compound (B) can be conducted in a solvent. Examples of the solvents are identical with those of the inert solvents used for preparing the liquid magnesium compound having no reduction ability (a). Of the aforementioned solvents, preferred are aliphatic hydrocarbons, and particularly preferred are saturated aliphatic hydrocarbons having 6 to 10 carbon atoms.

In the contact of the solid titanium composite (A) with the organometallic compound (B), the organometallic compound (B) is used in an amount of 0.1 to 100 mol, preferably 1 to 50 mol, based on 1 mol of the titanium atom in the solid titanium composite (A), and the concentration of the solid titanium composite (A) is in the range of 0.1 to 100 mol/liter-solvent, preferably 0.5 to 50 mol/liter-solvent, in terms of the titanium atom in the solid titanium composite (A). The contact time is in the range of 1 to 300 minutes, preferably 5 to 180 minutes, and the contact temperature is in the range of 0° to 100° C., preferably 10° to 50° C.

In the contact of the solid titanium organometallic compound complex with oxygen, the oxygen is used in an amount of 0.1 mol or more, preferably 0.1 to 100 mol, more preferably 0.2 to 10 mol, most preferably 0.3 to 3 mol, based on 1 mol of the titanium atom in the solid titanium organometallic compound complex. The contact time is in the range of 1 to 300 minutes, preferably 5 to 180 minutes, and the contact temperature is in the range of 0° to 100° C., preferably 10° to 50° C.

There is no specific limitation on the method of contacting the solid titanium organometallic compound complex with oxygen, but the following contact method may be used:

(1) A method of bringing a suspension of the solid titanium organometallic compound complex in an inert solvent into contact with air;

(2) A method of bringing a suspension of the solid titanium organometallic compound complex in an inert solvent into contact with ozone; and (3) A method of bringing a suspension of the solid titanium organometallic compound complex in an inert solvent into contact with gaseous oxygen.

Examples of the solvents used in the contact of the solid titanium organometallic compound complex with oxygen are identical with those of the inert solvents used for preparing the liquid magnesium compound having no reduction ability (a). Of the aforementioned solvents, preferred are aliphatic hydrocarbons, and particularly preferred are saturated aliphatic hydrocarbons having 6 to 10 carbon atoms.

By the contact of the solid titanium organometallic compound complex with oxygen, titanium contained therein is presumably bonded to oxygen.

The ethylene polymerization catalyst of the invention comprises the solid titanium catalyst component [I] and an organometallic compound catalyst component [II] containing a metal selected from Group I to Group III of the periodic table.

Figure is an explanatory view showing steps of the process for preparing the ethylene polymerization catalyst according to the invention.

As the organometallic compound catalyst component [II], there can be used, for example, an organoaluminum compound, an alkyl complex compound of Group I metal and aluminum, and an organometallic compound of Group II metal.

The organoaluminum compound is, for example, a compound represented by the following formula:

$R^a{}_n AlX_{3-n}$ wherein $R^a$ is a hydrocarbon group of 1 to 12 carbon atoms, X is a halogen atom or a hydrogen atom, n is 1 to 3.

In the above formula, $R^a$ is a hydrocarbon group of 1 to 12 carbon atoms, such as an alkyl group, a cycloalkyl group or an aryl group, more specifically, methyl, ethyl, n-propyl, isopropyl, isobutyl, pentyl, hexyl, octyl, cyclopentyl, cyclohexyl, phenyl or tolyl.

Examples of such organoaluminum compounds include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound is a compound represented by the following formula:

$R^a{}_n AlY_{3-n}$ wherein $R^a$ is the same as defined above, Y is $-OR^b$, $-OSiR^c{}_3$, $-OAlR^d{}_2$, $-NR^e{}_2$, $-SiR^f{}_3$ or $-N(R^g)AlR^h{}_2$, n is 1 to 2, $R^b$, $R^c$, $R^d$ and $R^h$ are each methyl, ethyl, isopropyl, isobutyl, cyclohexyl or phenyl, $R^e$ is hydrogen, methyl, ethyl, isopropyl, phenyl or trimethylsilyl, and $R^f$ and $R^g$ are each methyl or ethyl.

Examples of such organoaluminum compounds include:

(i) compounds of the formula: $R^a{}_n Al(OR^b)_{3-n}$, e.g., dimethylaluminum methoxide, diethylaluminum ethoxide and diisobutylaluminum methoxide;

(ii) compounds of the formula: $R^a{}_n Al(OSiR^c{}_3)_{3-n}$, e.g., $Et_2Al(OSiMe_3)$, $(iso-Bu)_2Al(OSiMe_3)$ and $(iso-Bu)_2Al(OSiEt_3)$;

(iii) compounds of the formula: $R^a{}_n Al(OAlR^d{}_2)_{3-n}$, e.g., $Et_2AlOAlEt_2$ and $(iso-Bu)_2AlOAl(iso-Bu)_2$;

(iv) compounds of the formula: $R^a{}_n Al(NR^e{}_2)_{3-n}$, e.g., $Me_2AlNEt_2$, $Et_2AlNHMe$, $Me_2AlNHEt$, $Et_2AlN(Me_3Si)_2$ and $(iso-Bu)_2AlN(Me_3Si)_2$;

(v) compounds of the formula: $R^a{}_n Al(SiR^f{}_3)_{3-n}$, e.g., $(iso-Bu)_2AlSiMe_3$; and (vi) compounds of the formula: $R^a{}_n Al(N(R^g)AlR^h{}_2)_{3-n}$, e.g., $Et_2AlN(Me)AlEt_2$ and $(iso-Bu)_2AlN(Et)Al(iso-Bu)_2$ Of the above-exemplified organoaluminum compounds, preferred are compounds represented by the formulas: $R^a{}_3Al$, $R^a{}_nAl(OR^b)_{3-n}$ and $R^a{}_nAl(OAlR^d{}_2)_{3-n}$.

The alkyl complex compound of Group I metal and aluminum is, for example, a compound represented by the general formula:

wherein $M^1$ is Li, Na or K, and $R^j$ is a hydrocarbon group of 1 to 15 carbon atoms.

Particular examples of such alkyl complex compounds include $LiAl(C_2H_5)_4$ and $LiAl(C_7H_{15})_4$.

The organometallic compound of Group II metal is, for example, a compound represented by the general formula:

wherein $R^k$ and $R^1$ are each a hydrocarbon group of 1 to 15 carbon atoms or a halogen atom, which may be the same or different except that $R^k$ and $R^1$ are halogen groups, and $M^2$ is Mg, Zn or Cd.

Particular examples of such organometallic compounds include diethylzinc, diethylmagnesium, butylethylmagnesium, ethylmagnesium chloride and butylmagnesium chloride.

The above-mentioned compounds may be used alone or in combination.

The ethylene polymerization catalyst may further contain the aforesaid diether compound (b) and an electron donor (f), if necessary, in combination with the organometallic compound catalyst component [II]. As the electron donor (f), the aforesaid electron donor (e) and an organosilicon compound can be employed. Of these, the diether compound (b) and the organosilicon compound are preferred.

The organosilicon compound is, for example, an organosilicon compound represented by the following general formula:

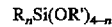

wherein R and R' are each a hydrocarbon group, and n is a number of 0<n<4.

Examples of the organosilicon compounds of the above formula include:

trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenytdimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyltris(β-methoxyethoxysilane), vinyltriacetoxysilane and dimethyltetraethoxydisiloxane;

cyclopentyltrimethoxysilane, 2-methylcyclopentyltrimethoxysilane, 2,3-dimethylcyclopentyltrimethoxysilane and cyclopentyltriethoxysilane;

dicyclopentyldimethoxysilane, bis(2-methylcyclopentyl)dimethoxysilane, bis(2,3-dimethylcyclopentyl)dimethoxysilane and dicyclopentyldiethoxysilane; and tricyclopentylmethoxysilane, tricyclopentylethoxysilane, dicyclopentylmethylmethoxysilane, dicyclopentylethylmethoxysilane, hexenyltrimethoxysilane, dicyclopentylmethylethoxysilane, cyclopentyldimethylmethoxysilane, cyclopentyldiethylmethoxysilane and cyclopentyldimethylethoxysilane.

Of these, preferably used are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicylohexyldimethoxysilane, cyclohexylmethyldimethoxysilane, 2-norbornanetriethoxysilane, 2-norbornanemethyldimethoxysilane, phenyltriethoxysilane, dicyclopentyldimethoxysilane, hexenyltrimethoxysilane, cyclopentyltriethoxysilane, tricyclopentylmethoxysilane and cyclopentyldimethylmethoxysilane.

As the electron donors (f) employable besides the organosilicon compounds, there can be mentioned, for example, other nitrogen-containing compounds, phosphorus-containing compounds and oxygen-containing compounds than those described above.

Examples of the nitrogen-containing compounds are described below.

2,6-Substituted piperidines, such as

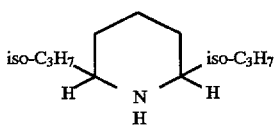

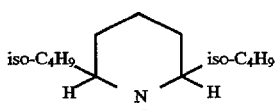

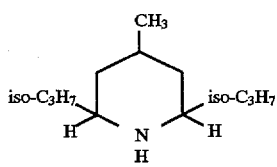

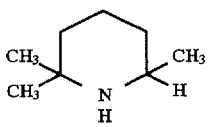
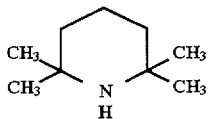
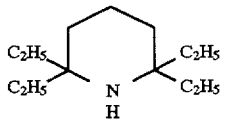
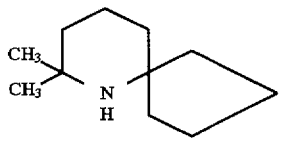
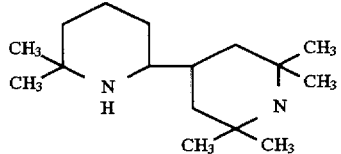
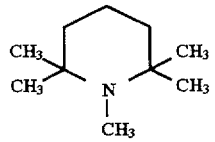
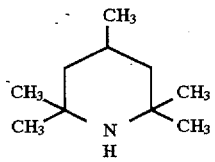
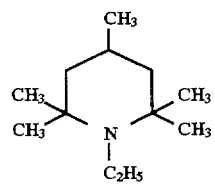
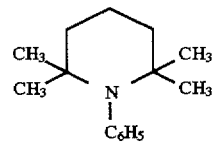
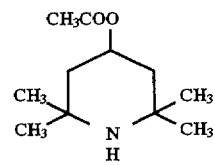

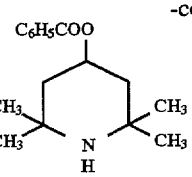
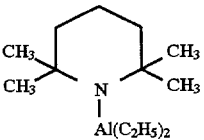
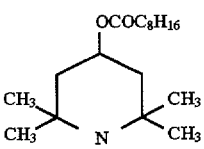
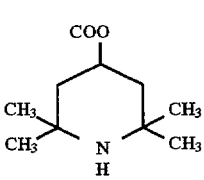

2,5-Substituted piperidines, such as

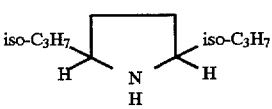
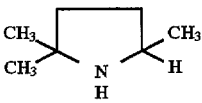
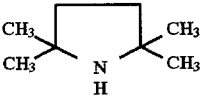
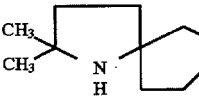
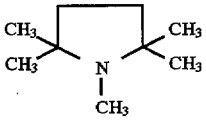
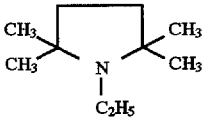

Substituted methylenediamines, such as N,N,N',N'-tetramethylmethylenediamine and N,N,N',N'-tetraethylmethylenediamine; and Substituted imidazolidines, such as 1,3-dibenzytimidazolidine and 1,3-dibenzyl-2-phenylimidazolidine.

Examples of the phosphorus-containing compounds include phosphites such as triethyl phosphite, tri-n-propyl phosphite, triisopropyl phosphite, tri-n-butyl phosphite, tri-isobutyl phosphite, diethyl-n-butyl phosphite and diethylphenyl phosphite.

Examples of the oxygen-containing compounds are described below.

2,6-Substituted tetrahydropyrans, such as

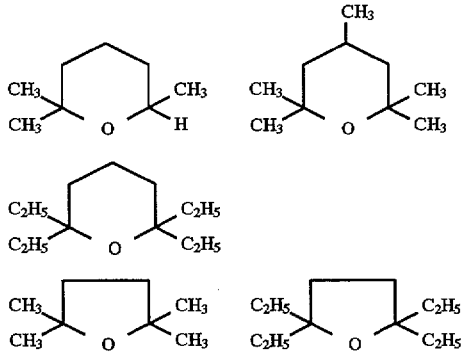

2,5-Substituted tetrahydropyrans, such as

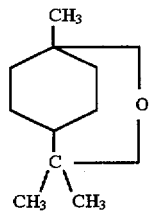

The ethylene polymer of the invention can be prepared by homopolymerizing ethylene or copolymerizing ethylene and other olefin than ethylene using the ethylene polymerization catalyst.

It is preferred that an α-olefin is prepolymerized with the ethylene polymerization catalyst prior to the polymerization or the copolymerization. In this prepolymerization, the α-olefin is prepolymerized in an amount of 0.1 to 1,000 g, preferably 0.3 to 500 g, most preferably 1 to 200 g, per 1 g of the ethylene polymerization catalyst.

It is desired that the concentration of the solid titanium catalyst component [I] in the prepolymerization is in the range of usually about 0.001 to 200 mmol, preferably about 0.01 to 50 mmol, particularly 0.1 to 20 mmol, in terms of titanium atom, based on 1 liter of the liquid medium. In the prepolymerization reaction system, the catalyst concentration can be higher than that in the main polymerization reaction system.

The organometallic compound catalyst component [II] is used in the prepolymerization in such an amount that a polymer is produced in an amount of 0.1 to 1,000 g, preferably 0.3 to 500 g, based on 1 g of the solid titanium catalyst component [I]. That is, the organometallic compound catalyst component [II] is used in an amount of usually about 0.1 to 300 mol, preferably about 0.5 to 100 mol, particularly 1 to 50 mol, based on 1 mol of the titanium atom in the solid titanium catalyst component [I].

In the prepolymerization, the diether compound (b) and the electron donor (e) may be used, if necessary. In this case, these components (b) and (e) are each used in an amount of 0.1 to 50 mol, preferably 0.5 to 30 mol, more preferably 1 to 10 mol, based on 1 mol of the titanium atom in the solid titanium catalyst component[I].

The prepolymerization can be carried out under mild conditions by adding the olefin and the above-mentioned catalyst components into an inert hydrocarbon medium.

Examples of the inert hydrocarbon media used herein include:
- aliphatic hydrocarbons, such as propane, butane, pentane, hexane, heptane, octane, decane, dodecane and kerosine;
- alicyclic hydrocarbons, such as cyclopentane, cyclohexane and methylcyclopentane;
- aromatic hydrocarbons, such as benzene, toluene and xylene;
- halogenated hydrocarbons, such as ethylene chloride and chlorobenzene; and
- mixtures of the above hydrocarbons.

Of these inert hydrocarbon media, the aliphatic hydrocarbons are preferably used. When the inert hydrocarbon medium is used, the prepolymerization is preferably carried out batchwise. Further, the prepolymerization may be carried out using the olefin itself as the medium or may be carried out substantially not using any medium. In this case, the prepolymerization is preferably carried out continuously.

The olefin used for the prepolymerization may be the same as or different from the later-described olefin used for the polymerization, but ethylene is preferably used as the olefin.

The reaction temperature for the prepolymerization is in the range of usually about −20° to +100° C., preferably about −20° to +80° C., more preferably 0° to +40° C.

In the prepolymerization, a molecular weight regulator such as hydrogen can be used. The molecular weight regulator is desirably used in such an amount that the resulting polymer has an intrinsic viscosity [η], as measured in decalin at 135° C., of about 0.2 dl/g or more, preferably about 5 to 10 dl/g.

It is desired that the prepolymerization is carried out in such a manner that the amount of the polymer produced by the prepolymerization is in the range of about 0.1 to 1,000 g, preferably about 0.3 to 500 g, particularly 1 to 200 g, based on 1 g of the solid titanium catalyst component [I]. When the amount of the polymer produced by the prepolymerization is too much, the production efficiency of the ethylene polymer produced in the main polymerization might be lowered.

The prepolymerization can be conducted batchwise or continuously.

Examples of olefins employable together with ethylene in the main polymerization include α-olefins of 3 to 20 carbon atoms such as propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the polymerization of ethylene, these olefins can be used alone or in combination. Further, there can be used, as the polymerization materials, compounds having a large number of unsaturated bonds, for example, aromatic vinyl compounds such as styrene and allylbenzene, alicyclic vinyl compounds such as vinylcyclohexane, cycloolefins such as cyclopentene, cycloheptene, norbornene, 5-methyl-2-norbornene, tetracyclododecene, 2-methyl-1,4,5,8-dimethano-1,2,3,4,4a,5,8,8a-octahydronaphthalene, and dienes (conjugated dienes and non-conjugated dienes) such as 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, isoprene and butadiene.

The polymerization of ethylene polymer may be conducted by any of a liquid phase polymerization such as a solution polymerization and a suspension polymerization, and a gas phase polymerization.

When the main polymerization is conducted by a liquid phase polymerization, the aforesaid inert hydrocarbon may be used as the reaction solvent, and an olefin which is liquid at the reaction temperature may also be used as the reaction solvent.

In the main polymerization, the solid titanium catalyst component [I] is used in an amount of usually about 0.001 to 0.5 mmol, preferably about 0.005 to 0.1 mmol, in terms of Ti atom, based on 1 liter of the polymerization volume. The organometallic compound catalyst component [II] is used in such an amount that the metal atom is in the range of usually about 1 to 2,000 mol, preferably about 5 to 500 mol, based on 1 mol of the titanium atom in the prepolymerization catalyst component of the polymerization system.

When hydrogen is used in the main polymerization, the molecular weight of the resulting polymer can be regulated, and hence a polymer having a high melt flow rate can be obtained.

The polymerization temperature is set within the range of usually about 20° to 200° C., preferably about 50° to 150° C., and the polymerization pressure is set within the range of usually atmospheric pressure to 100 kg/cm$^2$, preferably about 2 to 50 kg/cm$^2$. The polymerization can be conducted batchwise, semicontinuously or continuously. Further, the polymerization can be conducted in two or more stages having different reaction conditions.

The ethylene polymer obtained as above may be any of an ethylene homopolymer, an ethylene-olefin random copolymer and an ethylene-olefin block copolymer.

EFFECT OF THE INVENTION

The ethylene polymer according to the invention has a density and a melt flow rate (MFR) in the specific ranges, has a specific relation between the melt tension (MT) and the melt flow rate (MFR), and has a Mw/Mn value, a Mz/Mw value, a g* value and a swell ratio in the specific ranges. Hence, the ethylene polymer is excellent in moldability, and from this polymer a molded article excellent in rigidity and impact strength and free from poor appearance such as fish eye can be obtained.

By the process for preparing an ethylene polymer according to the invention, an ethylene polymer having excellent properties as mentioned above can be prepared with high polymerization activity.

By the use of the solid titanium catalyst component for ethylene polymerization and the ethylene polymerization catalyst according to the invention, an ethylene polymer having excellent properties as mentioned above can be prepared with high polymerization activity.

EXAMPLE

The present invention will be further described with reference to the following examples, but it should be construed that the invention is in no way limited to those examples.

Example 1

[Preparation of a solid titanium composite (A)]

95.2 g of anhydrous magnesium chloride, 442 ml of decane and 390.6 g of 2-ethylhexyl alcohol were heated at 130° C. for 2 hours to give a homogeneous solution. To the solution was added 21.3 g of phthalic anhydride, and they were stirred at 130° C. for 1 hour to dissolve the phthalic anhydride in the homogeneous solution. Then, 75 ml of the resulting homogeneous solution was dropwise added to 200 ml of titanium tetrachloride kept at −20° C. over a period of 1 hour. After the addition was completed, the temperature of the mixture was elevated to 110° C. over a period of 4 hours. When the temperature reached 110° C., 4.06 g of 2-isopropyl-2-isopentyl-1,3-dimethoxypropane was added to the mixture, and they were kept at the same temperature for 2 hours with stirring. Then, the solid produced was collected by means of hot filtration, and the solid was resuspended in 275 ml of titanium tetrachloride, followed by heating at 110° C. for 2 hours. Thereafter, the solid was again collected by means of hot filtration, and thoroughly washed with decane of 110° C. and hexane of room temperature until any titanium compound liberated in the washing liquid was not detected. Through the above procedures, a solid titanium composite (A) was prepared. This solid titanium composite (A) had a composition comprising 2.1% by weight of titanium, 18.0% by weight of magnesium, 7.2% by weight of 2-isopropyl-2-isopentyl-1,3-dimethoxypropane, 0.2% by weight of 2-ethylhexoxy group and 60% by weight of chlorine.

[Preparation of a solid titanium catalyst component (B)]

Into a 200-ml four-necked flask was introduced 100 ml of hexane at room temperature (26° C.) while purging the flask with nitrogen. To the flask were charged 3 mmol (in terms of aluminum atom) of triethylaluminum and 1 mmol (in terms of titanium atom) of the above-obtained solid titanium composite (A), followed by stirring at room temperature for 1 hour. After the stirring was completed, the solid produced was separated from the liquid by means of decantation. To the solid was added hexane, and they were stirred. Then, a purifying operation to remove the supernatant liquid through decantation was repeated three times, to obtain a solid titanium organometallic compound complex.

The solid titanium organometallic compound complex was resuspended in 100 ml of hexane. Then, 58.4 ml of dry air containing 11.2 Nml of oxygen was introduced into the gas phase, followed by stirring at room temperature for 1 hour. During the stirring, the volume decrease of the gas phase was measured using a gas burette. As a result, the volume decrease was 9.0 ml, and the amount of oxygen absorption was 8.2 Nml.

After the stirring was completed, the solid produced was separated from the liquid by means of decantation. To the solid was added hexane, and they were stirred. Then, a washing operation to remove the supernatant liquid through decantation was repeated twice, to obtain a solid titanium catalyst component (B).

[Polymerization]

Into a 2-liter autoclave was introduced 1 liter of purified hexane. To the autoclave were added 1 mmol of triethylaluminum and 0.01 mmol (in terms of titanium atom) of the solid titanium catalyst component (B) at 60° C. in an ethylene atmosphere.

Then, the temperature of the system was elevated up to 75° C., and hydrogen was introduced in such an amount that the gauge pressure became 1 kg/cm$^2$. Subsequently, ethylene was fed so that the gauge pressure became 8 kg/cm$^2$, followed by continuously feeding ethylene to keep the same pressure for 1 hour. During the feeding procedure, the temperature was kept at 80° C.

After the polymerization was completed, the slurry containing a solid product was filtered and separated into a white powder and a liquid phase. The white powder thus obtained was dried at 80° C. for 10 hours under reduced pressure.

To 100 g of the dried white powder (ethylene polymer) were added 200 mg of 3,5-di-tert-butyl-4-hydroxytoluene

29 and 100 mg of calcium stearate. The resulting mixture was pelletized at 200° C. using an extruder having a diameter of 20 mm (produced by Thermoplastic Co.). The pellets were measured on a melt tension (MT), a melt flow rate (MFR), a swell ratio (SR), a molecular weight distribution Mw/Mn, a molecular weight distribution Mz/Mw, a g* value and a density in accordance with the methods described before. The results are shown in table 1.

Example 2

[Polymerization]

Polymerization of ethylene was carried out in the same manner as described in example 1 except that hydrogen was introduced in such an amount that the gauge pressure became 3 kg/cm$^2$.

After the polymerization was completed, the slurry containing a solid product was filtered and separated into a white powder and a liquid phase. The white powder thus obtained was dried at 80° C. for 10 hours under reduced pressure.

The dried white powder (ethylene polymer) was measured on various properties in the same manner as described in Example 1. The results are shown in Table 1.

Example 3

[Preparation of a solid titanium catalyst component (B-1)]

Into a 200-ml four-necked flask was introduced 100 ml of hexane at room temperature (26° C.) while purging the flask with nitrogen. To the flask were added 3 mmol (in terms of aluminum atom) of triethylaluminum and 1 mmol (in terms of titanium atom) of the solid titanium composite (A), followed by stirring at room temperature for 1 hour. After the stirring was completed, the solid produced was separated from the liquid by means of decantation. To the solid was added hexane, and they were stirred. Then, a washing operation to remove the supernatant liquid through decantation was repeated three times, to obtain a solid titanium organometallic compound complex.

The solid titanium organometallic compound complex was resuspended in 100 ml of hexane. Then, 29.2 ml of dry air containing 5.6 Nml of oxygen was introduced into the gas phase, followed by stirring at room temperature for 1 hour. During the stirring, the volume decrease of the gas phase was measured using a gas burette. As a result, the volume decrease was 4.4 ml, and the amount of oxygen absorption was 4.0 Nml.

After the stirring was completed, the solid produced was separated from the liquid by means of decantation. To the solid was added hexane, and they were stirred. Then, a washing operation to remove the supernatant liquid through decantation was repeated twice, to obtain a solid titanium catalyst component (B-1).

[Polymerization]

Polymerization of ethylene was carried out in the same manner as described in Example 1 except that the solid titanium catalyst component (B-1) was used in place of the solid titanium catalyst component (B).

After the polymerization was completed, the slurry containing a solid product was filtered and separated into a white powder and a liquid phase. The white powder thus obtained was dried at 80° C. for 10 hours under reduced pressure.

The dried white powder (ethylene polymer) was measured on various properties in the same manner as described in Example 1. The results are shown in Table 1.

Example 4

[Polymerization]

Into a 2-liter autoclave thoroughly purged with nitrogen was introduced 850 ml of purified hexane, and the autoclave was purged with ethylene at room temperature. Then, the temperature of the system was elevated to 60° C. To the autoclave were charged 1.25 mmol of triethylaluminum, 0.025 mmol (in terms of titanium atom) of the solid titanium catalyst component (B) prepared in Example 1 and 150 ml of 4-methyl-1-pentene, and the autoclave was sealed. Thereafter, hydrogen was introduced into the autoclave until the pressure became 1.2 kg/cm$^2$. Then, ethylene was fed thereto so that the total pressure became 4 kg/cm$^2$, followed by continuously feeding ethylene to keep the same pressure for 2 hour.

After the polymerization was completed, the slurry was taken out of the autoclave at the time the internal temperature of the autoclave was 55° C., and was rapidly filtered to separate the white powder produced by polymerization from the liquid phase. The white powder thus obtained was dried at 80° C. for 10 hours under reduced pressure.

The dried white powder (ethylene polymer) was measured on various properties in the same manner as described in Example 1. The results are shown in Table 1.

Comparative Example 1

[Preparation of a solid titanium catalyst component (A-1)]

95.2 g of anhydrous magnesium chloride, 442 ml of decane and 390.6 g of 2-ethylhexyl alcohol were heated at 130° C. for 2 hours to give a homogeneous solution. To the solution was added 21.3 g of phthalic anhydride, and they were stirred at 130° C. for 1 hour to dissolve the phthalic anhydride in the homogeneous solution. Then, 75 ml of the resulting homogeneous solution was dropwise added to 200 ml of titanium tetrachloride kept at –20° C. over a period of 1 hour. After the addition was completed, the temperature of the mixture was elevated to 110° C. over a period of 4 hours. When the temperature reached 110° C., 5.22 g of diisobutyl phthalate was added to the mixture, and they were kept at the same temperature for 2 hours with stirring. Then, the solid produced was collected by means of hot filtration, and the solid was resuspended in 275 ml of titanium tetrachloride, followed by heating at 110° C. for 2 hours. Thereafter, the solid is again collected by means of hot filtration, and the solid was thoroughly washed with decane of 110° C. and hexane of room temperature until any titanium compound liberated in the washing liquid was not detected. Through the above procedures, a solid titanium catalyst component (A-1) was prepared. This solid titanium catalyst component (A-1) had a composition comprising 2.4% by weight of titanium, 19.0% by weight of magnesium, 12.4% by weight of diisobutyl phthalate and 60% by weight of chlorine, and no 2-ethylhexoxy group was detected.

[Polymerization]

Into a catalyst bottle thoroughly purged with nitrogen were introduced 20 ml of decane, 5 mmol of triethylaluminum and 0.1 mmol (in terms of titanium atom) of the solid titanium catalyst component (A-1), and they were stirred at room temperature for 5 minutes to obtain a decane slurry (C-1).

Into a 2 liter autoclave was introduced 1 liter of purified hexane in a nitrogen atmosphere. Then, the atmosphere in the autoclave was changed to an ethylene atmosphere, the temperature of the system was elevated to 60° C., and 4 ml (0.02 mmol in terms of titanium atom) of the decane slurry (C-1) was added to the autoclave.

Then, the temperature of the system was elevated up to 75° C., and hydrogen was introduced in such an amount that the gauge pressure became 1 kg/cm². Subsequently, ethylene was fed so that the gauge pressure became 8 kg/cm², followed by continuously feeding ethylene to keep the same pressure for 1 hour. During the feeding procedure, the temperature was kept at 80° C.

After the polymerization was completed, the slurry containing a solid product was filtered and separated into a white powder and a liquid phase. The white powder thus obtained was dried at 80° C. for 10 hours under reduced pressure.

The dried white powder (ethylene polymer) was measured on various properties in the same manner as described in Example 1. The results are shown in Table 1.

Comparative Example 2

[Preparation of a solid titanium catalyst component (A-2)]

In 1 liter of decane was suspended 0.75 mol of andhydrous magnesium chloride. To the resulting suspension was added 2.25 mol of 2-ethylhexanol. The temperature of the system was elevated with stirring, and the mixture was heated at 120° C. for 2 hours to obtain a colorless transparent homogeneous solution. This solution still remained colorless, transparent and homogeneous, though it was allowed to stand for cooling to room temperature.

In a 1-liter glass flask were introduced 400 ml of decane and 400 mmol (440 ml) of titanium tetrachloride in a nitrogen atmosphere, and they were cooled to 0° C. To the flask was dropwise added 100 mmol (in terms of magnesium atom) of the above-obtained colorless transparent homogeneous solution over a period of 20 minutes using a dropping funnel. As soon as the solution was dropwise added, bubbling started, and the resulting mixture turned into an yellow suspension. After the addition was completed, the temperature of the suspension was elevated at a rate of 4° C./min, and stirring of the suspension was continued at 80° C. for 1 hour. Thereafter, the solid produced was separated from the liquid phase using a glass filter in a nitrogen atmosphere, and the solid was washed with 2 liters of decane. The solid was resuspended in 900 ml of decane, and the resulting suspension was heated at 120° C. for 1 hour and 30 minutes. Through the above procedures, a solid titanium catalyst component (A-2) was obtained.

The solid titanium catalyst component (A-2) had a composition comprising 8.1% by weight of titanium, 55.0% by weight of chlorine, 17.0% by weight of magnesium and 0.04% by weight of 2-ethylhexoxy group.

[Polymerization]

Into a 2-liter autoclave was introduced 1 liter of purified hexane in a nitrogen atmosphere, and the temperature of the system was elevated to 50° C. To the autoclave were added 1.0 mmol of triisobutylaluminum and 0.02 mmol (in terms of titanium atom) of the above-obtained solid titanium catalyst component (A-2), and the autoclave was sealed. Then, hydrogen was introduced in such an amount that the gauge pressure became 4 kg/cm². Subsequently, ethylene was fed so that the gauge pressure became 8 kg/cm², followed by continuously feeding ethylene to keep the same pressure for 2 hours. During the feeding procedure, the temperature was kept at 80° C.

After the polymerization was completed, the slurry containing a solid product was filtered and separated into a white powder and a liquid phase. The white powder thus obtained was dried at 80° C. for 10 hours under reduced pressure.

The dried white powder (ethylene polymer) was measured on various properties in the same manner as described in Example 1. The results are shown in Table 1.

Comparative Example 3

[Preparation of a solid titanium catalyst component (A-3)]

In 88.4 ml of decane was suspended 19.1 g of magnesium chloride. Then, to the system was added 78.1 g of 2-ethylhexanol. The temperature of the system was elevated up to 135° C., and the mixture was stirred for 4 hours while keeping the system at 135° C., to obtain a colorless transparent homogeneous solution. After the solution thus obtained was cooled to 100° C., 9.58 g of tetraethoxysilane was added thereto at 100° C., and they were stirred at 100° C. for 1 hour to obtain a magnesium chloride-containing decane solution. Into a 400-ml flask was introduced 200 ml of titanium tetrachloride, and the system was cooled to −20° C. Then, to the flask was dropwise added 50 ml of the above-obtained magnesium chloride-containing decane solution (concentration of magnesium chloride: 1 mol/liter) over a period of 2 hours. The system was slowly heated, and the resulting mixture was stirred at 90° C. for 2 hours, followed by hot filtration. The solid obtained was washed with decane of 90° C. and then thoroughly washed with decane of room temperature, to obtain a solid titanium catalyst component (A-3).

This solid titanium catalyst component (A-3) had composition comprising 10.7% by weight of titanium, 57% by weight of chlorine, 12.0% by weight of magnesium and 8.4% by weight of 2-ethylhexoxy group.

Into a 500-ml flask was introduced 400 ml of decane. To the flask was added 3.59 g of the solid titanium catalyst component (A-3) and were further added 20 ml of a decane solution of an aluminum compound having an average composition of $Al(O-i-C_3H_7)Cl_2$ (Al Concentration: 1 mol/liter) and 0.15 ml of isopropanol. The temperature of the system was elevated, and the resulting mixture was stirred at 150° C. for 3 hours. The solid produced was collected by hot filtration, washed with decate of 130° C., and then thoroughly washed with decate of room temperature to obtain a solid titanium catalyst component (A-4).

This solid titanium catalyst component (A-4) had a composition comprising 4.1% by weight of titanium, 11% by weight of magnesium, 49% by weight of chlorine, 12.9% by weight of aluminum and 0.2% by weight of isopropoxy group.

[Polymerization]

Into a 2-liter autoclave was introduced 1 liter of purified hexane in a nitrogen atmosphere, and the temperature of the system was elevated up to 50° C. To the autoclave were charged 1.0 mmol of triisobutylaluminum and 0.02 mmol (in terms of titanium atom) of the above-obtained solid titanium catalyst component (A-4), and the autoclave was sealed. Then, hydrogen was introduced in such an amount that the gauge pressure became 4 kg/cm². Subsequently, ethylene was fed so that the gauge pressure became 8 kg/cm², followed by continuously feeding ethylene to keep the same pressure for 2 hours. During the feeding procedure, the temperature was kept at 80° C.

After the polymerization was completed, the slurry containing a solid product was filtered and separated into a white powder and a liquid phase. The white powder thus obtained was dried at 80° C. for 10 hours under reduced The dried white powder (ethylene polymer) was measured on various properties in the same manner as described in Example 1. The results are shown in Table 1.

Comparative Example 4

[Preparation of a solid catalyst component (A-5)]

A 3-liter autoclave was thoroughly purged with nitrogen. Into the autoclave were charged 1.5 liters of purified kerosine, 75 g of anhydrous magnesium chloride, 109 g of ethanol and 10 g of Emasol 320 (sorbitan distearate, available from Kao Atlas Co., Ltd.). The temperature of the system was elevated with stirring, and the resulting mixture was stirred at 125° C. for 20 minutes at 600 rpm. The pressure in the system was made 10 kg/cm$^2$-G using nitrogen. Then, a cock of a SUS (stainless steel) tube (inner diameter: 3 mm) directly connected with the autoclave and warmed at 125° C. was opened, and the liquid in the autoclave was transferred into a 5-liter glass flask (equipped with a stirrer) in which 3 liters of purified kerosine cooled to −15° C. had been previously introduced. The amount of the liquid thus transferred was 1 liter, and the time required for the transference was about 20 seconds. The solid produced was collected by filtration and thoroughly washed with hexane.

To 12 g of the solid was added 200 ml of decane to give a slurry. The slurry was cooled to 0° C. and kept at the same temperature. To the slurry was dropwise added 125 mmol of diethylaluminum chloride over a period of 30 minutes. After the addition was completed, the slurry was kept at room temperature for t hour, then heated to 90° C., and kept at the same temperature for 3 hours. Through this operation, organoaluminum was partly fixed onto the magnesium chloride. The slurry was allowed to stand, and the supernatant liquid was removed. To the resulting mataerial was added decane to give a slurry again. This operation was repeated twice. Then, to the slurry was added 200 ml of decane, and the resulting slurry was kept at 0° C. with stirring, followed by dropwise adding thereto a mixture of 5 mmol of vanadyl trichloride diluted with 10 ml of decane and 5 mmol of titanium chloride over a period of 15 minutes. After the addition was completed, the temperature of the system was elevated to 80° C., and the system was kept at the same temperature for 1 hour. Then, the resulting solid product was collected by filtration and washed with decane until any vanadium and titanium liberated in the washing liquid were not detected, to obtain a solid catalyst component (A-5).

[Polymerization]

Into a 2-liter autoclave were introduced 1 liter of purified decane, 2.0 mmol of triisobutylaluminum and 0.01 mmol (in terms of the total metal atoms of titanium and vanadium) of the solid catalyst component (A-5). After the temperature of the system was set to 40° C., an ethylene gas was introduced so that the total pressure became 8 kg/cm$^2$-G, and then polymerization was effected for 1 minute (first stage). Then, the ethylene gas was released, and a hydrogen gas was introduced so that the pressure became 1 kg/cm$^2$-G. Subsequently, the temperature of the system was elevated to 70° C., and an ethylene gas was again introduced so that the total pressure became 8 kg/cm$^2$-G, and then the polymerization was restarted. Thereafter, ethylene was continuously fed so that the total pressure was kept at 8 kg/cm$^2$-G, and the polymerization was continued at 80° C. for 80 minutes.

After the polymerization was completed, the slurry containing a solid product was filtered and separated into a white powder and a liquid phase. The white powder thus obtained was dried at 80° C. for 10 hours under reduced pressure.

The dried white powder (ethylene polymer) was measured on various properties in the same manner as described in Example 1. The results are shown in Table 1.

Comparative Example 5

[Preparation of a solid titanium catalyst component (B-2)]

Into a 200-ml four-necked flask was introduced 100 ml of hexane at room temperature (26° C.) while purging the flask with nitrogen. To the flask were charged 3 mmol (in terms of aluminum atom) of triethylaluminum and 1 mmol (in terms of titanium atom) of the solid titanium composite (A), followed by stirring at room temperature for 1 hour. After the stirring was completed, the solid produced was separated from the liquid by means of decantation. To the solid was added hexane, and they were stirred. Then, a washing operation to remove the supernatant liquid through decantation was repeated three times, to obtain a solid titanium catalyst component (B-2).

[Polymerization]

Polymerization of ethylene was carried out in the same manner as described in Example 1 except that the solid titanium catalyst component (B-2) was used in place of the solid titanium catalyst component (B).

After the polymerization was completed, the slurry containing a solid product was filtered and separated into a white powder and a liquid phase. The white powder thus obtained was dried at 80° C. for 10 hours under reduced pressure.

The dried white powder (ethylene polymer) was measured on various properties in the same manner as described in Example 1. The results are shown in Table 1.

Comparative Example 6

[Preparation of a solid titanium composite (A-6)]

Into a 400-ml four-necked flask thoroughly purged with nitrogen were introduced 5 g (52.5 mmol) of anhydrous magnesium chloride and 190 ml of purified decane. To the flask was dropwise added 18.4 ml (315 mmol) of ethanol at room temperature (26° C.) over a period of 45 minutes with stirring. After the addition was completed, the resulting mixture was stirred at room temperature for 1 hour.

Then, to the mixture was dropwise added 17.2 ml (137 mmol) of diethylaluminum chloride over a period of 1 hour while controlling the temperature of the system in the range of 35° to 40° C. After the addition was completed, the resulting mixture was stirred at room temperature for 1 hour.

Subsequently, 69.2 ml (630 mmol) of titanium tetrachloride was added to the mixture and they were stirred at 80° C. for 2 hours. The reaction product was subjected to hot filtration using a glass filter equipped with a jacket to separate the solid from the liquid phase. The solid was washed with 600 ml of purified decane.

Through the above procedures, a solid titanium composite (A-6) was obtained. This solid titanium composite (A-6) had a composition comprising 4.8% by weight of titanium, 2.2% by weight of aluminum, 15.0% by weight of magnesium, 56.0% by weight of chlorine and 8.8% by weight of ethoxy group.

[Preparation of a solid titanium catalyst component (B-3)]

Into a 200-ml four-necked flask was introduced 100 ml of hexane at room temperature (26° C.) while purging the flask with nitrogen. To the flask were added 3 mmol (in terms of aluminum atom) of triethylaluminum and 1 mmol (in terms of titanium atom) of the above-obtained solid titanium compostie (A-6), followed by stirring at room temperature for 1 hour. After the stirring was completed, the solid produced was separated from the liquid by means of decantation. To the solid was added hexane, and they were stirred. Then, a washing operation to remove the supernatant liquid through decantation was repeated three times.

The resulting material was resuspended in 100 ml of hexane, and 58.4 ml of dry air was introduced into the gas phase zone, followed by stirring at room temperature for 1 hour. During the stirring, the volume decrease of the gas phase was measured using a gas burette. As a result, the volume decrease was 10.1 ml.

After the stirring was completed, the solid produced was separated from the liquid by means of decantation. To the solid was added hexane, and they were stirred. Then, a washing operation to remove the supernatant liquid through decantation was repeated twice, to obtain a solid titanium catalyst component (B-3).

[Polymerization]

Polymerization of ethylene was carried out in the same manner as described in Example 1 except that the solid titanium catalyst component (B-3) was used in place of the solid titanium catalyst component (B).

After the polymerization was completed, the slurry containing a solid product was filtered and separated into a white powder and a liquid phase. The white powder thus obtained was dried at 80° C. for 10 hours under reduced pressure.

The dried white powder (ethylene polymer) was measured on various properties in the same manner as described in Example 1. The results are shown in Table 1.

TABLE 1

| | Yield (g) | Catalytic Activity*[1] | MFR g/10 min. | MT g | α *[2] | SR | Mw/Mn | Mz/Mn | g* | Density g/cm³ |
|---|---|---|---|---|---|---|---|---|---|---|
| Ex.1 | 161.6 | 8100 | 0.06 | 16.5 | 0.73 | 1.37 | 5.18 | 3.11 | 1.00 | 0.96 |
| Ex.2 | 106.6 | 5300 | 1.80 | 4.3 | 0.74 | 1.36 | 6.31 | 3.54 | 0.99 | 0.96 |
| Ex.3 | 164.2 | 8200 | 0.07 | 16.0 | 0.74 | 1.36 | 5.25 | 3.17 | 1.00 | 0.97 |
| Ex.4 | 78.7 | 3900 | 0.90 | 5.5 | 0.72 | 1.35 | 6.04 | 3.22 | 0.98 | 0.93 |
| Comp Ex.1 | 207.9 | 10400 | 0.04 | 15.5 | 0.62 | 1.20 | 5.22 | 3.18 | 1.00 | 0.95 |
| Comp Ex.2 | 184.2 | 9200 | 0.75 | 12.0 | 1.03 | 1.43 | 10.30 | 6.44 | 1.00 | 0.96 |
| Comp Ex.3 | 189.7 | 9500 | 0.21 | 30.0 | 1.21 | *[3] | 13.87 | 7.96 | 0.99 | 0.96 |
| Comp Ex.4 | 343.7 | 34400 | 0.19 | 18.2 | 0.97 | 1.34 | 9.86 | 6.37 | 1.00 | 0.97 |
| Comp Ex.5 | 225.0 | 11300 | 0.05 | 26.9 | 0.91 | 1.32 | 5.73 | 3.14 | 1.00 | 0.96 |
| Comp Ex.6 | 378.2 | 18900 | 0.07 | 14.5 | 0.70 | 1.29 | 5.70 | 3.75 | 0.99 | 0.97 |

*[1] g-PE/mmol-Ti
*[2] α = log MT + 0.4 × log MFR
*[3] unmeasurable (occurrence of melt fracture)

As is apparent from the results shown in Table 1, the ethylene polymer of the invention satisfies the aforementioned properties (i) to (vii). Therefore, the ethylene polymer has a high density, a specific relation between the melt tension and the melt flow rate, a high swell ratio, a narrow molecular weight distribution (Mw/Mn, Mz/Mw) and a g* value near to 1. Such ethylene polymer is excellent in moldability, and from this ethylene polymer, a molded article which is excellent in rigidity and impact strength and almost free from poor appearance can be obtained.

What is claimed is:

1. An ethylene polymer having the following properties:
   (i) a density in the range of from 0.94 to 0.98 g/cm³,
   (ii) a melt flow rate, as measured at 190° C. under a load of 2.16 kg, in the range of from 0.02 to 10 g/10 min,
   (iii) a melt tension (MT) and melt flow rate (MFR) which satisfies the relationship represented by the formula:

$$\log MT < -0.4 \log MFR + 0.75$$

(iv) a molecular weight distribution Mw/Mn in the range of from 3 to 8,
   (v) a molecular weight distribution Mz/Mw in the range of from 2 to 5,
   (vi) a g* value, which is an index of a proportion of long-chain branches, in the range of from 0.90 to 1.00, and
   (vii) a swell ratio in the range of from 1.35 or more.

2. The ethylene polymer as claimed in claim 1, which is prepared by the use of Ziegler-Natta catalyst.

3. The ethylene polymer as claimed in claim 1, which is prepared by the use of an ethylene polymerization catalyst comprising:
   [I] a solid titanium catalyst component obtained by the contact with each other of oxygen and a solid titanium organometallic compound complex which is obtained by the contact with each other of
      (A) a solid titanium composite containing titanium, magnesium, halogen and a compound having at least two ether linkages present through plural atoms, which is obtained by the contact with each other of
         (a) a liquid magnesium compound having no reduction ability,
         (b) a compound having at least two ether linkages present through plural atoms, and
         (c) a liquid titanium compound, and optionally
         (d) a precipitating agent,
      wherein at least one of said components (a), (b), (c) and (d) contains a halogen-containing compound, and
      (B) an organometallic compound containing a metal selected from Group I to Group III of the periodic table; and
   [II] an organometallic compound catalyst component containing a metal selected from Group I to Group III of the periodic table.

4. The ethylene polymer as claimed in claim 1, which is prepared by the use of an ethylene polymerization catalyst comprising:
   [I] a solid titanium catalyst component obtained by the contact with each other of oxygen and a solid titanium organometallic compound complex which is obtained by the contact with each other of (A) a solid titanium composite containing titanium, magnesium, halogen and a compound having at least two ether linkages present through plural atoms, which is obtained by the contact with each other of
  (a) magnesium chloride,
  (b) 2-isopropyl-2-isopentyl-1,3-dimethoxy propane,
  (c) titanium tetrachloride, and optionally
  (d) a precipitating agent,
wherein at least one of said components (a), (b), (c) and (d) contains a halogen-containing compound,
and
  (B) an organoaluminum compound represented by the following formula:

$$R^a{}_n AlX_{3-n}$$

wherein $R^a$ is a hydrocarbon group of 1 to 12 carbon atoms, X is a halogen atom or a hydrogen atom, and n is 1 to 3; and (II) an organoaluminum compound represented by the following formula:

$$R^a{}_n AlX_{3-n}$$

wherein $R^a$ is a hydrocarbon group of 1 to 12 carbon atoms, X is a halogen atom or a hydrogen atom, and n is 1 to 3.

* * * * *